US012560075B2

(12) United States Patent
Wu et al.

(10) Patent No.: US 12,560,075 B2
(45) Date of Patent: Feb. 24, 2026

(54) GRADATIONAL RESISTIVITY MODELS WITH LOCAL ANISOTROPY FOR DISTANCE TO BED BOUNDARY INVERSION

(71) Applicant: Halliburton Energy Services, Inc., Houston, TX (US)

(72) Inventors: Hsu-Hsiang Wu, Houston, TX (US); Dagang Wu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/732,040

(22) Filed: Jun. 3, 2024

(65) Prior Publication Data

US 2024/0410265 A1     Dec. 12, 2024

Related U.S. Application Data

(60) Provisional application No. 63/472,505, filed on Jun. 12, 2023.

(51) Int. Cl.
| | |
|---|---|
| *E21B 7/04* | (2006.01) |
| *E21B 44/00* | (2006.01) |
| *E21B 49/00* | (2006.01) |
| *G01V 3/20* | (2006.01) |

(52) U.S. Cl.
CPC .............. *E21B 44/00* (2013.01); *E21B 7/04* (2013.01); *E21B 49/00* (2013.01); *G01V 3/20* (2013.01)

(58) Field of Classification Search
CPC ......... E21B 7/04; E21B 44/00; E21B 2200/20
See application file for complete search history.

(56) References Cited

U.S. PATENT DOCUMENTS

| | | | |
|---|---|---|---|
| 6,594,584 B1 * | 7/2003 | Omeragic ................ | G01V 3/28 |
| | | | 702/9 |
| 7,093,672 B2 * | 8/2006 | Seydoux ............... | E21B 47/022 |
| | | | 175/24 |
| 7,786,733 B2 * | 8/2010 | Seydoux ................. | G01V 3/28 |
| | | | 324/334 |

(Continued)

FOREIGN PATENT DOCUMENTS

| | | |
|---|---|---|
| CN | 106597545 A | 4/2017 |

OTHER PUBLICATIONS

Zhang, Zhiyi et al. "Determining Bed Boundaries From Inversion of EM Logging Data Using General Measures of Model Structure and Data Misfit." Geophysics Journal, vol. 65, Issue No. 1, Jan. 2000, pp. 76-82. PDF file. 7 pages.

(Continued)

*Primary Examiner* — Kenneth L Thompson
(74) *Attorney, Agent, or Firm* — Benjamin Ford; C. Tumey Law Group PLLC

(57)          ABSTRACT

In general, in one aspect, embodiments relate to a method and/or system for obtaining one or more measurements collected by a downhole tool at a wellbore depth and defining a piecewise-polynomial inversion model describing one or more formation parameters. Systems and methods herein may further be for performing an inversion on the piecewise-polynomial inversion model to determine one or more formation parameters of the inversion model, and adjusting a path of the downhole tool based at least in part on the or more formation parameters of the piecewise-polynomial inversion model.

20 Claims, 14 Drawing Sheets

(56)                References Cited

U.S. PATENT DOCUMENTS

| | | | | |
|---|---|---|---|---|
| 9,045,967 | B2 * | 6/2015 | Heliot | E21B 47/022 |
| 9,611,731 | B2 | 4/2017 | Hou et al. | |
| 9,638,830 | B2 * | 5/2017 | Meyer | E21B 44/00 |
| 9,927,551 | B2 | 3/2018 | Hou et al. | |
| 9,971,057 | B2 * | 5/2018 | Donderici | G01V 3/28 |
| 10,024,104 | B2 * | 7/2018 | Wu | E21B 47/022 |
| 10,087,744 | B2 | 10/2018 | Wu | |
| 10,197,695 | B2 * | 2/2019 | Itskovich | E21B 44/00 |
| 10,227,861 | B2 | 3/2019 | Wu et al. | |
| 10,302,785 | B2 * | 5/2019 | Dirksen | G01V 1/306 |
| 10,317,561 | B2 | 6/2019 | Wu | |
| 10,401,529 | B2 | 9/2019 | Wu et al. | |
| 10,416,336 | B2 | 9/2019 | Li et al. | |
| 10,416,339 | B2 | 9/2019 | Wu et al. | |
| 10,458,230 | B2 * | 10/2019 | Donderici | E21B 49/00 |
| 10,648,316 | B2 * | 5/2020 | Wilson | G06F 17/11 |
| 10,822,878 | B2 * | 11/2020 | Difoggio | E21B 7/06 |
| 10,823,871 | B2 * | 11/2020 | Donderici | E21B 47/013 |
| 10,914,858 | B2 | 2/2021 | Celepcikay et al. | |
| 10,942,706 | B2 * | 3/2021 | Langhammer | G06F 7/499 |
| 11,008,836 | B2 | 5/2021 | Wu et al. | |
| 11,099,293 | B2 * | 8/2021 | Dong | G01V 3/20 |
| 11,111,776 | B2 | 9/2021 | Fan et al. | |
| 11,143,023 | B2 | 10/2021 | Ma et al. | |
| 11,174,727 | B2 | 11/2021 | Bittar et al. | |
| 11,286,763 | B2 * | 3/2022 | Omeragic | E21B 47/024 |
| 11,299,978 | B2 | 4/2022 | Song et al. | |
| 11,391,859 | B2 | 7/2022 | Pan et al. | |
| 11,402,533 | B2 | 8/2022 | Wu et al. | |
| 11,448,794 | B2 * | 9/2022 | Thiel | G06F 30/20 |
| 11,454,102 | B2 * | 9/2022 | Wessling | E21B 7/04 |
| 11,459,870 | B2 | 10/2022 | Ma et al. | |
| 11,543,552 | B2 | 1/2023 | Wu et al. | |
| 11,603,750 | B2 | 3/2023 | Fan et al. | |
| 11,674,378 | B2 | 6/2023 | Bittar et al. | |
| 11,680,479 | B2 | 6/2023 | Fan et al. | |
| 12,366,153 | B2 * | 7/2025 | Skoff | G06F 16/285 |
| 12,371,992 | B2 * | 7/2025 | Jensen | E21B 49/087 |
| 12,404,762 | B2 * | 9/2025 | Boualleg | E21B 7/10 |
| 12,428,950 | B2 * | 9/2025 | Liu | E21B 47/024 |
| 12,435,570 | B2 * | 10/2025 | Sahli | E21B 7/04 |
| 2009/0157361 | A1 * | 6/2009 | Toghi | E21B 47/022 |
| | | | | 703/3 |
| 2014/0163887 | A1 | 6/2014 | Wu et al. | |
| 2014/0324353 | A1 | 10/2014 | Hou et al. | |
| 2015/0142320 | A1 | 5/2015 | Wu et al. | |
| 2016/0024908 | A1 | 1/2016 | Wu | |
| 2016/0054467 | A1 | 2/2016 | Li et al. | |
| 2016/0258273 | A1 | 9/2016 | Hou et al. | |
| 2016/0282503 | A1 | 9/2016 | Hou et al. | |
| 2017/0254921 | A1 | 9/2017 | Wu et al. | |
| 2020/0256183 | A1 * | 8/2020 | Guner | E21B 47/12 |
| 2020/0378247 | A1 | 12/2020 | Ma et al. | |
| 2021/0047921 | A1 | 2/2021 | Bittar et al. | |
| 2021/0055436 | A1 | 2/2021 | Wu et al. | |
| 2021/0079785 | A1 | 3/2021 | Fan et al. | |
| 2021/0190987 | A1 | 6/2021 | Wu et al. | |
| 2021/0363870 | A1 | 11/2021 | Fan et al. | |
| 2021/0363876 | A1 | 11/2021 | Fan et al. | |
| 2022/0025763 | A1 | 1/2022 | Bittar et al. | |
| 2022/0397695 | A1 | 12/2022 | Ma et al. | |
| 2023/0214548 | A1 * | 7/2023 | Pan | G01V 3/38 |
| | | | | 703/2 |
| 2024/0191621 | A1 * | 6/2024 | Dass | E21B 49/02 |

OTHER PUBLICATIONS

Sinha, Supriya et al. "Past, Present, and Future Applications of Ultradeep Directional Resistivity Measurements: A Case History From the Norwegian Continental Shelf." Petrophysics Journal, vol. 63, Issue No. 6, Dec. 2022, pp. 604-633. PDF file. 30 pages.

International Search Report and Written Opinion for International Patent Application No. PCT/US2024/033218 dated Sep. 30, 2024. PDF file. 9 pages.

\* cited by examiner

1000

PRIOR FORMATION MODEL                 BIT (TOOL REFERENCE)                 1020 GEOSTEERING INVERSION

RES
100
10
1

1022
Rt

Rs1  Rs2  Rsn  RS  1024

LINEAR IN LOG SCALE

DTBB

GRADIENT RES.

RAW MEASUREMENT

LOOK-AHEAD PROFILE WINDOW

D1    D2    1023

BIT (TOOL REFERENCE)                          RS

Rt

D1    D2

1110
Sd                          1000

BIT (TOOL REFERENCE)

Rt                                      1120

Sr

D1

LOOK-AHEAD PROFILE WINDOW $$\lambda^1 = \lambda^2 = \ldots = \lambda^n = \lambda_{GLOBAL}$$

GRADATIONAL RESISTIVITY MODELS WITH LOCAL ANISOTROPY FOR DISTANCE TO BED BOUNDARY INVERSION

BACKGROUND

The present disclosure relates generally to hydrocarbon exploration and production, and particularly, to geosteering inversion techniques for directional drilling operations in hydrocarbon exploration and production. Geosteering is known as the process of adjusting the deviation of a wellbore to steer a downhole tool in a desired direction or toward a predetermined target location within an underground reservoir formation. This process generally requires petrophysicists to analyze real-time measurements of various downhole tools so that geological information surrounding the wellbore can be understood and thereby optimized wellbore development can be achieved in real-time.

Geosteering inversion based on numerical optimization techniques (e.g., Gauss-Newton gradient inversion) also may be utilized to invert formation geology and minimize any discrepancy between a downhole tool's measurements and forward modeling responses based on the inversion. Such inversion techniques may provide petrophysicists with a way to quickly estimate formation properties in real-time. However, conventional inversion techniques may produce unreliable estimates when, for example, the downhole tool's measurements are not sufficiently sensitive to the targeted formation or the varying formation properties between different formation layers are difficult to distinguish. Without reliable estimates of formation properties including distinguishing between layers of formation, the inversion might fail to produce an effective formation model. Specifically, the model may not minimize discrepancy between the modeled formation properties and the observed real-world properties of the actual formation. In addition, gradient boundary models may improve conventional inversion. However, current gradient boundary models do not include local anisotropy properties in its models.

DETAILED DESCRIPTION

Figure 1:
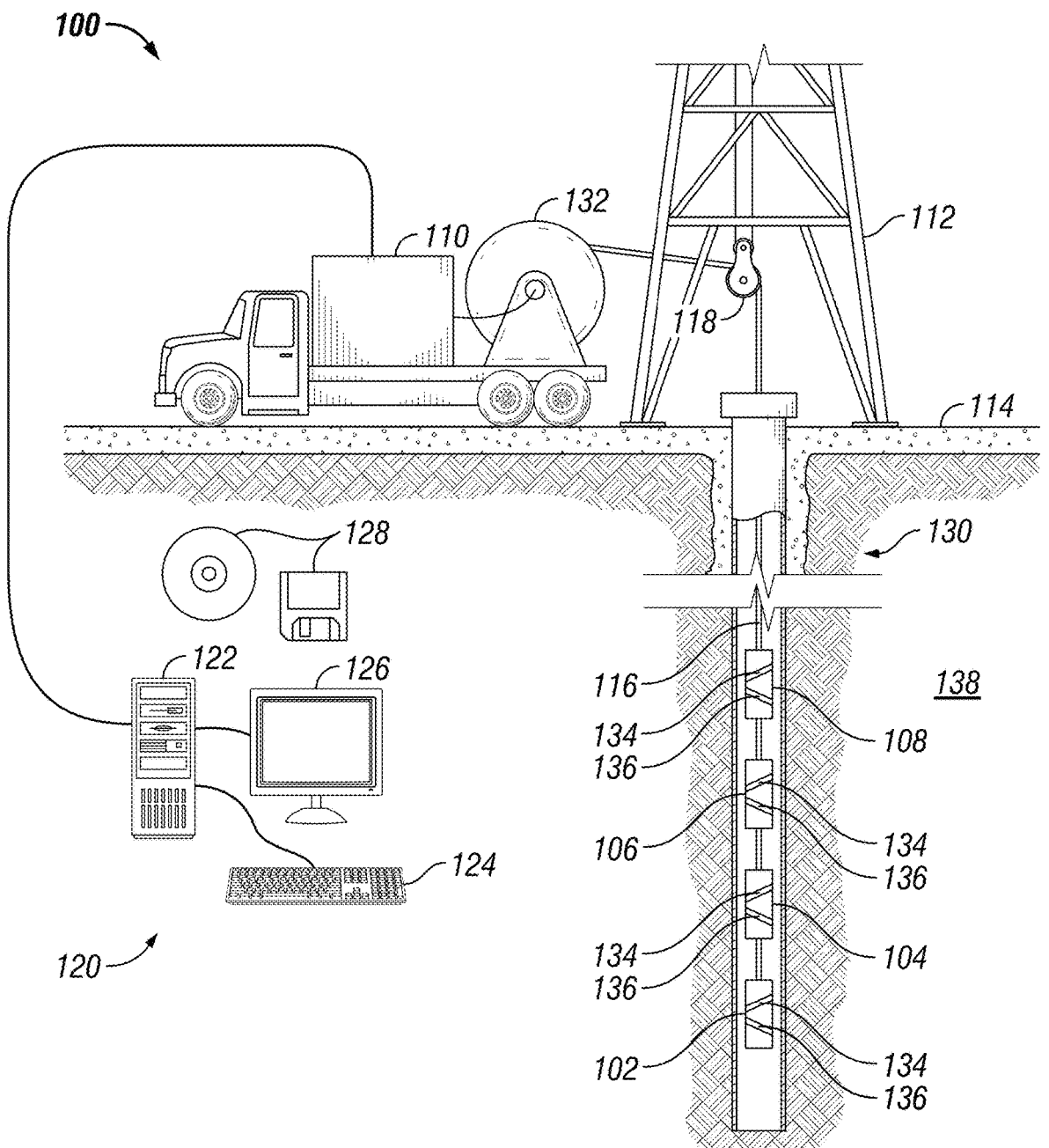
FIG. 1 illustrates a cross-sectional view of a well measurement system.

Examples of the present disclosure relate to performing a knowledge-based geosteering inversion for geosteering based on measurements from a downhole look-ahead look-around (LALA) tool. Specifically, methods and systems are applied to acquire local anisotropy measurements and apply them to gradient boundary models. Such gradient boundary models may then be applied to improve a geosteering inversion model. In addition, gradational resistivity profiles may be acquired within the same depth range as local anisotropy measurements. Examples of the present disclosure relate to systems and techniques for performing a knowledge-based inversion with gradient transition profiles between formation layers to improve look-ahead performance and geosteering accuracy during directional drilling. There are multiple advantages of using gradient boundary properties to build more accurate inversion models, such as: Fewer inversion unknowns and closer to realistic formation boundaries requiring fewer and more accurate inversions. In one or more examples, a downhole LALA tool may be configured to measure various properties of an underground formation during a drilling operation for the exploration and/or production of hydrocarbon deposits from a reservoir within the formation.

Such a LALA tool may be, for example, an electromagnetic resistivity tool for measuring the formation's resistivity in areas ahead of the tool (look-ahead) and surrounding the tool (look-around). However, it should be noted that examples are not intended to be limited thereto and that the disclosed examples may be applied to other types of LALA tools, e.g., acoustic or ultrasonic tools. Further, it should be noted that such tools may be used to measure other types of formation properties, e.g., permeability, permittivity, etc. Examples of the present disclosure relate to systems and techniques for performing a knowledge-based inversion with gradient transition profiles between formation layers to improve look-ahead performance and geosteering accuracy during directional drilling. In one or more examples, a downhole LALA tool may be configured to measure various properties of an underground formation during a drilling operation for the exploration and/or production of hydrocarbon deposits from a reservoir within the formation. Such a LALA tool may be, for example, an electromagnetic resistivity tool for measuring the formation's resistivity in areas ahead of the tool (look-ahead) and surrounding the tool (look-around). However, it should be noted that examples are not intended to be limited thereto and that the disclosed examples may be applied to other types of LALA tools, e.g., acoustic or ultrasonic tools. Further, it should be noted that such tools may be used to measure other types of formation properties, e.g., permeability, permittivity, etc.

As will be described in further detail below, the knowledge-based geosteering inversion techniques disclosed herein may utilize shallow and ultra-deep measurements from the LALA tool to define formation properties in layers behind a tool reference point and predict formation properties in layers ahead. It should be noted that the geosteering inversion may also be referred to as a look-ahead inversion. Measurements within a certain depth range may be obtained from the tool and analyzed on the basis of signal derivation, variance, or other signal characteristics to provide detailed information for the inversion. In one or more examples, a forward model with a look-ahead profile window representing a gradient transition of formation properties in layers ahead of the tool reference may be used for the geosteering inversion. Similarly, look-around profile windows for areas of the formation above and below the tool reference may also be used for the inversion. Further, the disclosed geosteering inversion techniques may be combined with various processing schemes and complex formation models suitable for exploring formation properties at varying depths. In some implementations, the disclosed techniques may be used in an automated closed loop drilling system for enabling automated proactive geosteering in real-time applications.

FIG. 1 illustrates a cross-sectional view of a look-ahead look-around (LALA) well measurement system 100. As illustrated, well measurement system 100 may include a first LALA sub assembly 102, a second LALA sub assembly 104, a third LALA sub assembly 106, and/or a fourth LALA sub assembly 108. Each sub assembly may work together as a logging tool. It should be noted that well measurement system 100 may include only first LALA sub assembly 102. As illustrated, first LALA sub assembly 102, second LALA sub assembly 104, third LALA sub assembly 106, and/or fourth LALA sub assembly 108 may attach to a vehicle 110. In examples, it should be noted that first LALA sub assembly 102, second LALA sub assembly 104, third LALA sub assembly 106, and/or fourth LALA sub assembly 108 may not be attached to a vehicle 110. First LALA sub assembly 102, second LALA sub assembly 104, third LALA sub assembly 106, and/or fourth LALA sub assembly 108 may be supported by rig 112 at surface 114. First LALA sub assembly 102, second LALA sub assembly 104, third LALA sub assembly 106, and/or fourth LALA sub assembly 108 may be tethered to vehicle 110 through conveyance 116. Conveyance 116 may be disposed around one or more sheave wheels 118 to vehicle 110. Conveyance 116 may include any suitable means for providing mechanical conveyance for first LALA sub assembly 102, second LALA sub assembly 104, third LALA sub assembly 106, and/or fourth LALA sub assembly 108, including, but not limited to, wireline, slickline, coiled tubing, pipe, drill pipe, downhole tractor, or the like. In some embodiments, conveyance 116 may provide mechanical suspension, as well as electrical connectivity, for first LALA sub assembly 102, second LALA sub assembly 104, third LALA sub assembly 106, and/or fourth LALA sub assembly 108. Conveyance 116 may include, in some instances, a plurality of electrical conductors extending from vehicle 110. Conveyance 116 may include an inner core of several electrical conductors covered by an insulating wrap. It should be noted that conveyance 116 may be a wireline, slickline, drill string (as described below in logging while drilling applications and/or measuring while drilling applications), coiled tubing, tractor, and/or the like. An inner and outer steel armor sheath may be wrapped in a helix in opposite directions around the conductors. The electrical conductors may be used for communicating power and telemetry between vehicle 110 and first LALA sub assembly 102, second LALA sub assembly 104, third LALA sub assembly 106, and/or fourth LALA sub assembly 108. Information from first LALA sub assembly 102, second LALA sub assembly 104, third LALA sub assembly 106, and/or fourth LALA sub assembly 108 may be gathered and/or processed by information handling system 120. For example, signals recorded by first LALA sub assembly 102, second LALA sub assembly 104, third LALA sub assembly 106, and/or fourth LALA sub assembly 108 may be stored on memory and then processed by first LALA sub assembly 102, second LALA sub assembly 104, third LALA sub assembly 106, and/or fourth LALA sub assembly 108. The processing may be performed real-time during data acquisition or after recovery of first LALA sub assembly 102, second LALA sub assembly 104, third LALA sub assembly 106, and/or fourth LALA sub assembly 108. Processing may alternatively occur downhole or may occur both downhole and at surface. In some embodiments, signals recorded by first LALA sub assembly 102, second LALA sub assembly 104, third LALA sub assembly 106, and/or fourth LALA sub assembly 108 may be conducted to information handling system 120 by way of conveyance 116. Information handling system 120 may process the signals, and the information contained therein may be displayed for an operator to observe and stored for future processing and reference. Information handling system 120 may also contain an apparatus for supplying control signals and power to first LALA sub assembly 102, second LALA sub assembly 104, third LALA sub assembly 106, and/or fourth LALA sub assembly 108.

Systems and methods of the present disclosure may be implemented, at least in part, with information handling system 120. Information handling system 120 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 120 may be a personal computer, a network storage device, or any other suitable device and may vary in size, shape, performance, functionality, and price. Information handling system 120 may include random access memory (RAM), one or more processing resources such as a central processing unit (CPU) 122 or hardware or software control logic, ROM, and/or other types of nonvolatile memory. Additional components of the information handling system 120 may include one or more disk drives, one or more network ports for communication with external devices as well as an input device 124 (e.g., keyboard, mouse, etc.) and output devices, such as a video display 126. Information handling system 120 may also include one or more buses operable to transmit communications between the various hardware components.

Alternatively, systems and methods of the present disclosure may be implemented, at least in part, with non-transitory computer-readable media 128. Non-transitory computer-readable media 128 may include any instrumentality or aggregation of instrumentalities that may retain data and/or instructions for a period of time. Non-transitory computer-readable media 128 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, rig 112 includes a load cell (not shown) which may determine the amount of pull on conveyance 116 at the surface of wellbore 130. Information handling system 120 may include a safety valve which controls the hydraulic pressure that drives drum 132 on vehicle 110 which may reel up and/or release conveyance 116 which may move first LALA sub assembly 102, second LALA sub assembly 104, third LALA sub assembly 106, and/or fourth LALA sub assembly 108 up and/or down wellbore 130. The safety valve may be adjusted to a pressure such that drum 132 may only impart a small amount of tension to conveyance 116 over and above the tension necessary to retrieve conveyance 116 and/or first LALA sub assembly 102, second LALA sub assembly 104, third LALA sub assembly 106, and/or fourth LALA sub assembly 108 from wellbore 130. The safety valve is typically set a few hundred pounds above the amount of desired safe pull on conveyance 116 such that once that limit is exceeded; further pull on conveyance 116 may be prevented.

In examples, first LALA sub assembly 102, second LALA sub assembly 104, third LALA sub assembly 106, and/or fourth LALA sub assembly 108 may include a transmitter 134 and/or a receiver 136. It should be noted that transmitter 134, receiver 136, a plurality of transmitters, a plurality of receivers, a plurality of antennas, and/or any combination thereof may be referred to as an antenna, a co-located antenna, and/or a coil. Furthermore, any transmitter 134 or any receiver 136 may be a coil or an antenna. In examples, first LALA sub assembly 102, second LALA sub assembly 104, third LALA sub assembly 106, and/or fourth LALA sub assembly 108 may operate with additional equipment (not illustrated) on surface 114 and/or disposed in a separate well measurement system (not illustrated) to record measurements and/or values from formation 138. During operations, transmitter 134 may broadcast a signal from first LALA sub assembly 102, second LALA sub assembly 104, third LALA sub assembly 106, and/or fourth LALA sub assembly 108. Transmitter 134 may be connected to information handling system 120, which may further control the operation of transmitter 134. Additionally, receiver 136 may measure and/or record signals broadcasted from transmitter 134. Receiver 136 may transfer recorded information to information handling system 120. Information handling system 120 may control the operation of receiver 136. For example, the broadcasted signal from transmitter 134 may be reflected by formation 138. The reflected signal may be recorded by receiver 136. The recorded signal may be transferred to information handling system 120 for further processing. In examples, there may be any suitable number of transmitters 134 and/or receivers 136, which may be controlled by information handling system 120. Information and/or measurements may be processed further by information handling system 120 to determine properties of wellbore 130, fluids, and/or formation 138.

Figure 2:
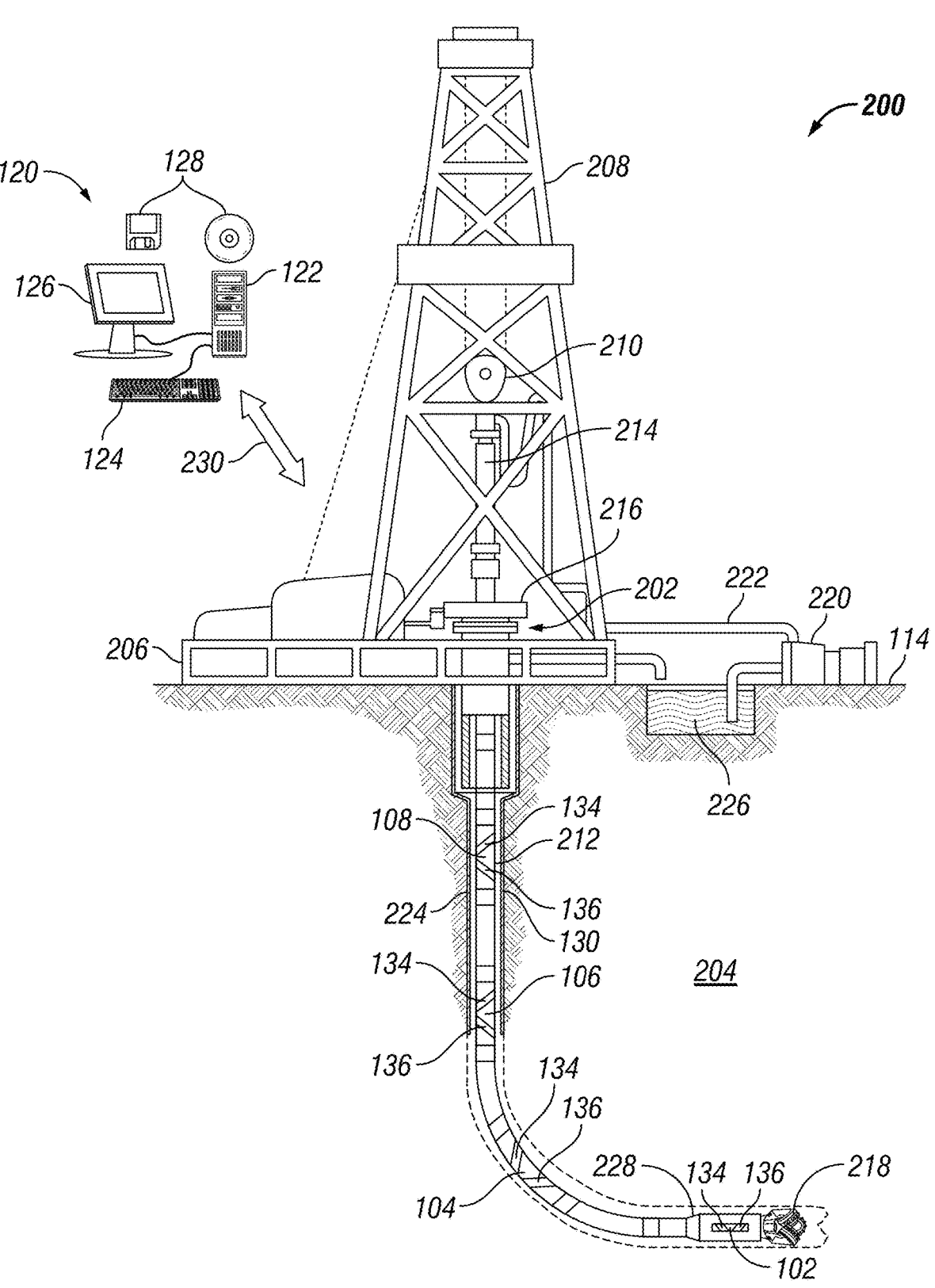
FIG. 2 illustrates an example in which first sub assembly, second sub assembly, third sub assembly, and/or fourth sub assembly.

FIG. 2 illustrates an example in which first LALA sub assembly 102, second LALA sub assembly 104, third LALA sub assembly 106, and/or fourth LALA sub assembly 108 (e.g., Referring to FIG. 1) may be disposed in a drilling system 200. As illustrated, wellbore 130 may extend from a wellhead 202 into a subterranean formation 138 from surface 114 (e.g., Referring to FIG. 1). Generally, wellbore 130 may include horizontal, vertical, slanted, curved, and other types of wellbore geometries and orientations. Wellbore 130 may be cased or uncased. In examples, wellbore 130 may include a metallic material. By way of example, the metallic member may be a casing, liner, tubing, or other elongated steel tubular disposed in wellbore 130.

As illustrated in FIG. 2, wellbore 130 may extend through subterranean formation 138. Without limitation, wellbore 130 may extending generally vertically into the subterranean formation 138, however wellbore 130 may extend at an angle through subterranean formation 138, such as horizontal and slanted wellbores. For example, although FIG. 2 illustrates a vertical or low inclination angle well, high inclination angle or horizontal placement of the well and equipment may be possible. It should further be noted that while FIG. 2 generally depicts a land-based operation, those skilled in the art may recognize that the principles described herein are equally applicable to subsea operations that employ floating or sea-based platforms and rigs, without departing from the scope of the disclosure.

As illustrated, a drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 114. Without limitation, drill bit 218 may include, roller cone bits, PDC bits, natural diamond bits, any hole openers, reamers, coring bits, and the like. As drill bit 218 rotates, it may create and extend wellbore 130 that penetrates various subterranean formations 138. A pump 220 may circulate drilling fluid through a feed pipe 222 to kelly 214, downhole through interior of drill string 212, through orifices in drill bit 218, back to surface 114 via annulus 224 surrounding drill string 212, and into a retention pit 226.

With continued reference to FIG. 2, drill string 212 may begin at wellhead 202 and may traverse wellbore 130. Drill bit 218 may be attached to a distal end of drill string 212 and may be driven, for example, either by a downhole motor and/or via rotation of drill string 212 from surface 114 (e.g., Referring to FIG. 1). Drill bit 218 may be a part of bottom hole assembly 228 at distal end of drill string 212. Bottom hole assembly 228 may further include first LALA sub assembly 102 (e.g., Referring to FIG. 1). First LALA sub assembly 102 may be disposed on the outside and/or within bottom hole assembly 228. It should be noted that second LALA sub assembly 104, third LALA sub assembly 106, and/or fourth LALA sub assembly 108 may be disposed on drill string 212. Second LALA sub assembly 104, third LALA sub assembly 106, and/or fourth LALA sub assembly 108 may be disposed on the outside and/or within drill string 212. First LALA sub assembly 102, second LALA sub assembly 104, third LALA sub assembly 106, and/or fourth LALA sub assembly 108 may include a transmitter 134 and/or a receiver 136 (e.g., Referring to FIG. 1). It should be noted that first LALA sub assembly 102, second LALA sub assembly 104, third LALA sub assembly 106, and/or fourth LALA sub assembly 108 may include a plurality of transmitters 134 and/or receivers 136. Transmitters 134 and/or receivers 136 may operate and/or function as described above. As will be appreciated by those of ordinary skill in the art, first LALA sub assembly 102, second LALA sub assembly 104, third LALA sub assembly 106, and/or fourth LALA sub assembly 108 may be a measurement-while drilling (MWD) or logging-while-drilling (LWD) system.

Without limitation, first LALA sub assembly 102, second LALA sub assembly 104, third LALA sub assembly 106, and/or fourth LALA sub assembly 108, transmitters 134, and/or receiver 136 may be connected to and/or controlled by information handling system 120 (e.g., Referring to FIG. 1), which may be disposed on surface 114. Without limitation, information handling system 120 may be disposed down hole in first LALA sub assembly 102, second LALA sub assembly 104, third LALA sub assembly 106, and/or fourth LALA sub assembly 108. Processing of information recorded may occur down hole and/or on surface 114. Processing occurring downhole may be transmitted to surface 114 to be recorded, observed, and/or further analyzed. Additionally, information recorded on information handling system 120 that may be disposed down hole may be stored until first LALA sub assembly 102, second LALA sub assembly 104, third LALA sub assembly 106, and/or fourth LALA sub assembly 108 may be brought to surface 114. In examples, information handling system 120 may communicate with first LALA sub assembly 102, second LALA sub assembly 104, third LALA sub assembly 106, and/or fourth LALA sub assembly 108 through a communication line (not illustrated) disposed in (or on) drill string 212. In examples, wireless communication may be used to transmit information back and forth between information handling system 120 and first LALA sub assembly 102, second LALA sub assembly 104, third LALA sub assembly 106, and/or fourth LALA sub assembly 108. Information handling system 120 may transmit information to first LALA sub assembly 102, second LALA sub assembly 104, third LALA sub assembly 106, and/or fourth LALA sub assembly 108 and may receive as well as process information recorded by first LALA sub assembly 102, second LALA sub assembly 104, third LALA sub assembly 106, and/or fourth LALA sub assembly 108. In examples, a downhole information handling system (not illustrated) may include, without limitation, a microprocessor or other suitable circuitry, for estimating, receiving and processing signals from first LALA sub assembly 102, second LALA sub assembly 104, third LALA sub assembly 106, and/or fourth LALA sub assembly 108. Downhole information handling system (not illustrated) may further include additional components, such as memory, input/output devices, interfaces, and the like. In examples, while not illustrated, first LALA sub assembly 102, second LALA sub assembly 104, third LALA sub assembly 106, and/or fourth LALA sub assembly 108 may include one or more additional components, such as analog-to-digital converter, filter and amplifier, among others, that may be used to process the measurements of first LALA sub assembly 102, second LALA sub assembly 104, third LALA sub assembly 106, and/or fourth LALA sub assembly 108 before they may be transmitted to surface 114. Alternatively, raw measurements from first LALA sub assembly 102, second LALA sub assembly 104, third LALA sub assembly 106, and/or fourth LALA sub assembly 108 may be transmitted to surface 114.

Any suitable technique may be used for transmitting signals from first LALA sub assembly 102, second LALA sub assembly 104, third LALA sub assembly 106, and/or fourth LALA sub assembly 108 to surface 114, including, but not limited to, wired pipe telemetry, mud-pulse telemetry, acoustic telemetry, and electromagnetic telemetry. While not illustrated, first LALA sub assembly 102, second LALA sub assembly 104, third LALA sub assembly 106, and/or fourth LALA sub assembly 108 may include a telemetry subassembly that may transmit telemetry data to surface 114. Without limitation, an electromagnetic source in the telemetry subassembly may be operable to generate pressure pulses in the drilling fluid that propagate along the fluid stream to surface 114. At surface 114, pressure transducers (not shown) may convert the pressure signal into electrical signals for a digitizer (not illustrated). The digitizer may supply a digital form of the telemetry signals to information handling system 120 via a communication link 230, which may be a wired or wireless link. The telemetry data may be analyzed and processed by information handling system 120.

As illustrated, communication link 230 (which may be wired or wireless, for example) may be provided that may transmit data from first LALA sub assembly 102, second LALA sub assembly 104, third LALA sub assembly 106, and/or fourth LALA sub assembly 108 to an information handling system 120 at surface 114. Information handling system 120 may include a central processing unit 122 (e.g., Referring to FIG. 1), a video display 126 (e.g., Referring to FIG. 1), an input device 124 (e.g., keyboard, mouse, etc.) (e.g., Referring to FIG. 1), and/or non-transitory computer-readable media 128 (e.g., optical disks, magnetic disks) (e.g., Referring to FIG. 1) that may store code representative of the methods described herein. In addition to, or in place of processing at surface 114, processing may occur downhole.

First LALA sub assembly 102, second LALA sub assembly 104, third LALA sub assembly 106, and/or fourth LALA sub assembly 108 may include a transmitter 134 and/or a receiver 136. In examples, first LALA sub assembly 102, second LALA sub assembly 104, third LALA sub assembly 106, and/or fourth LALA sub assembly 108 may operate with additional equipment (not illustrated) on surface 114 and/or disposed in a separate well measurement system (not illustrated) to record measurements and/or values from subterranean formation 138. During operations, transmitter 134 may broadcast a signal from first LALA sub assembly 102, second LALA sub assembly 104, third LALA sub assembly 106, and/or fourth LALA sub assembly 108. Transmitter 134 may be connected to information handling system 120, which may further control the operation of transmitter 134. Additionally, receiver 136 may measure and/or record signals broadcasted from transmitter 134. Receiver 136 may transfer recorded information to information handling system 120. Information handling system 120 may control the operation of receiver 136. For example, the broadcasted signal from transmitter 134 may be reflected by subterranean formation 138. The reflected signal may be recorded by receiver 136. The recorded signal may be transferred to information handling system 120 for further processing. In examples, there may be any suitable number of transmitters 134 and/or receivers 136, which may be controlled by information handling system 120. Information and/or measurements may be processed further by information handling system 120 to determine properties of wellbore 130 (e.g., Referring to FIG. 1), fluids, and/or subterranean formation 138.

Figure 3:
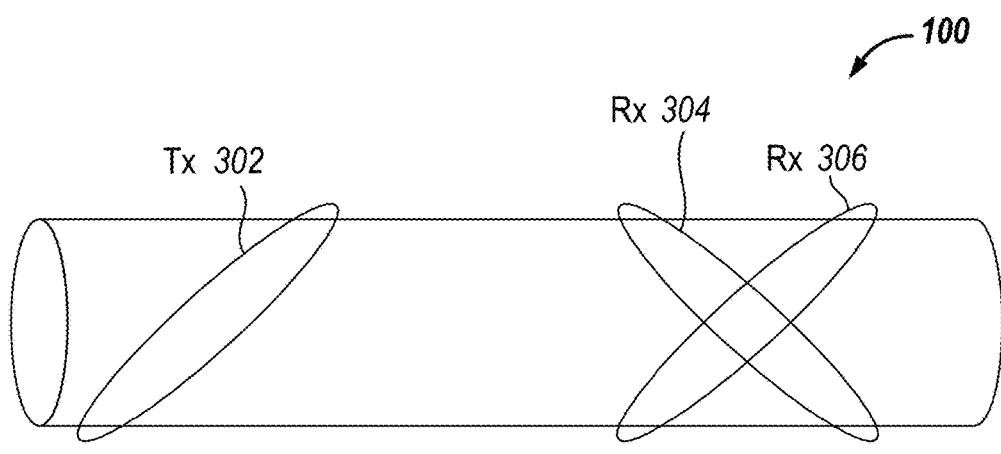
FIG. 3 illustrates an exemplary downhole Look-Ahead Look-Around (LALA) tool with a tilted antenna configuration.

FIG. 3 illustrates an example of a first LALA sub assembly 102 with an antenna structure including a tilted transmitter coil 302 and two tilted receiver coils 304 and 306. Transmitter coil 302 in this example may be configured to transmit look-ahead and/or look-around signals that propagate through different areas of a surrounding rock formation. Receiver coils 304 and 306 may be configured to receive the transmitted signal(s). While only transmitter coil 302 and receiver coils 304 and 306 are shown in FIG. 1, it should be noted that additional transmitter and/or receiver coils with different orientation and tilt angles may be used as desired for a particular implementation. In one or more examples, LALA sub assembly 102 may be integrated into a bottom-hole assembly at the end of a drill string. A drilling assembly including the drill string and bottom-hole assembly may be connected to a drilling rig and disposed within a wellbore being drilled through different layers of the rock formation. For example, a first LALA sub assembly 102 may be part of a measurement or logging section of the bottom-hole assembly. In one or more examples, a first LALA sub assembly 102 may be in the form of a drill collar located immediately before a drill bit at a distal end of the bottom-hole assembly. First LALA sub assembly 102 may be used to collect measurements of formation properties at different depths as the drill bit extends the wellbore through the formation during the drilling operation. The measurements collected by a first LALA sub assembly 102 may also include, for example, data relating to its own orientation, position, and any other relevant operating conditions.

In one or more examples, the measurements collected by a first LALA sub assembly 102 may be sent to a control unit (not shown) located at the surface. The measurements obtained from a first LALA sub assembly 102 may be processed by the control unit to determine formation resistivity and/or other formation properties of interest. The processing performed by the control unit may include, for example, generating a formation model for geosteering inversion. The results of the geosteering inversion may then be used to make appropriate geosteering decisions, e.g., for adjusting or optimizing a planned path of the wellbore being drilled through the formation. The measurements may be transferred from a first LALA sub assembly 102 to the control unit via, for example, a telemetry system, wired communication pathway, or wireless connection between a first LALA sub assembly 102 and the control unit. Alternatively, the control unit may be integrated within the bottom-hole assembly itself to automate the geosteering process and adjust/optimize the planned wellbore path in real time during the drilling operation, as will be described in further detail below with respect to FIG. 24.

In one or more examples, a first LALA sub assembly 102 may use transmitter coil 302 and receiver coils 304 and 306 to induce an electromagnetic field into the surrounding formation for measuring the formation's resistivity in areas ahead of the tool (look-ahead) and areas above and below the tool (look-around). For example, the look-ahead and/or look-around signals transmitted and received by a first LALA sub assembly 102 may be in the form of an electromagnetic signal including look-ahead and look-around components that propagate through the surrounding formation. However, it should be noted that a first LALA sub assembly 102 may be adapted to transmit and receive other types of signals, e.g., acoustic or ultrasonic signals, for measuring other types of formation properties, as desired for a particular implementation.

In the above example, the look-ahead signal may be only a small portion of a total LALA signal produced by a first LALA sub assembly 102 and therefore, may be difficult to distinguish from the look-around portion of the total LALA signal. Without good differentiation between look-ahead and look-around signals, geosteering inversion based on measurements from a first LALA sub assembly 102 may fail to produce reliable inversion results that can be used for proactive geosteering during the drilling operation. Thus, examples of the present disclosure may utilize a downhole LALA tool configuration that enables a knowledge-based inversion process in which look-ahead signals can be effectively differentiated from look-around signals based on the measurements collected by the downhole tool.

Figure 4:
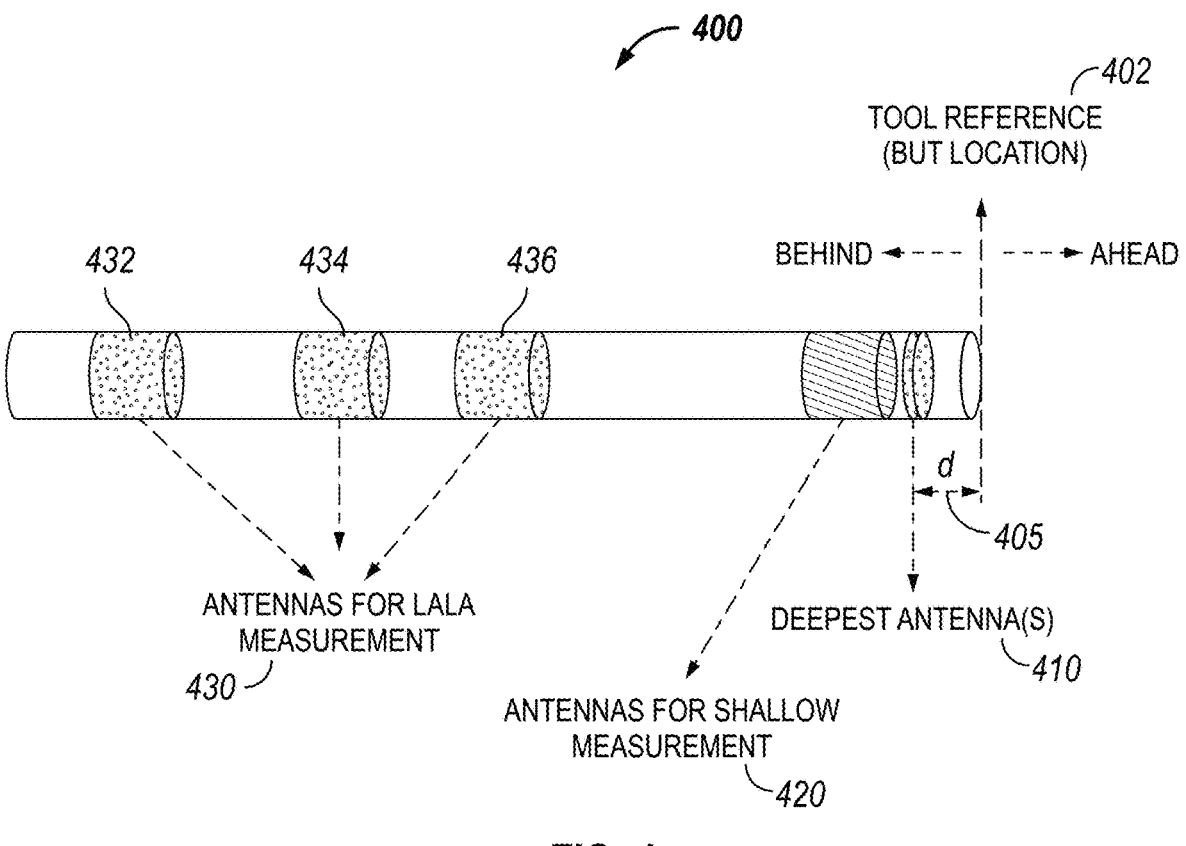
FIG. 4 illustrates an exemplary configuration of a downhole LALA tool for enabling a knowledge-based LALA inversion for geosteering.

FIG. 4 illustrates an exemplary configuration of a downhole LALA tool 400 for enabling the knowledge-based geosteering inversion techniques disclosed herein. Like first LALA sub assembly 102 of FIG. 1-3, described above, LALA tool 400 may be integrated into a bottom-hole assembly at the end of a drill string disposed within a wellbore being drilled through a rock formation. In one or more examples, LALA tool 400 may have a designated reference point or location (or "tool reference") 402 relative to which a current depth of LALA tool 400 within the formation may be measured during the drilling operation. Tool reference 402 may correspond to, for example, the location of a drill bit (not shown) at the distal end of the bottom-hole assembly.

As shown in FIG. 4, LALA tool 400 may include a plurality of antennas 410, 420, and 430 positioned at different locations throughout LALA tool 400 for collecting measurements of formation properties at various depths relative to tool reference 402. The measured formation properties may include, but are not limited to, formation resistivity in areas ahead of and behind tool reference 402. Each of antennas 410, 420, and 430 may be, for example, one or a set of antennas that can function as a transmitter or receiver of electromagnetic signals propagated through the formation. In one or more examples, antennas 410, 420, and 430 may have coils that can be tilted to focus electromagnetic fields through the formation at varying ranges of depth around LALA tool 400 and ahead of tool reference 402. It should be appreciated that such tilted coil antennas may be placed in any of various angles or orientations within LALA tool 400, as desired for a particular implementation.

Antenna(s) 410 in this example may represent the deepest of the antennas of LALA tool 400. To maximize the depth of measurement ahead of tool reference 402, antenna(s) 410 may be positioned near the drill bit such that a distance 405 between antenna 410 and the drill bit is zero or as close as possible thereto. Antennas 420 may be used to acquire shallow measurements of formation properties within a limited range of detection in an area behind tool reference 402. Antennas 420 may be positioned at a predetermined radial distance (e.g., on the order of one to four feet) above the deepest antenna(s) 410, depending on the frequency and resolution of the electromagnetic field produced by antennas 420 for acquiring the shallow measurements. Antennas 430 may be used to acquire ultra-deep or LALA measurements of formation properties within an extended range of detection surrounding LALA tool 400. As shown in FIG. 4, antennas 430 may include multiple antennas 432, 434, and 436, which may be separated from the deepest antenna(s) 410 by a predetermined distance (e.g., ranging from 5 feet to 100 feet) according to their respective operating frequencies and the desired detection ranges. In one or more examples, each of antennas 432, 434, and 436 may be a set of antennas including multiple antennas for attaining a desired detection range using ultra-deep signals.

In one or more examples, the shallow and ultra-deep measurements collected by LALA tool 400 may be used to generate a multi-layered formation model for performing geosteering inversion. Such measurements may be used, for example, to effectively differentiate look-ahead signals from look-around signals in the inversion. In one or more examples, the shallow measurements from LALA tool 400 may be used to determine the formation properties in surrounding areas behind tool reference 402 with a relatively high degree of precision while the ultra-deep measurements may be used to determine formation properties in areas ahead of tool reference 402. The well-differentiated look-ahead signal and relatively precise formation properties derived from the shallow measurements may then be utilized in a knowledge-based geosteering inversion technique for providing improved forward modeling responses and geosteering performance, as will be described in further detail below with respect to FIG. 3.

FIG. 3 is a process flowchart of an exemplary method 300 for performing a knowledge-based LALA inversion based on measurements of underground formation properties from a downhole LALA tool. In one or more examples, the LALA tool may be specially configured to provide the appropriate measurements needed to perform the knowledge-based inversion during a drilling operation. For example, the steps of method 300 may be performed based on measurements obtained from LALA tool 400 of FIG. 4, as described above. However, method 300 is not intended to be limited thereto. The results of the knowledge-based inversion may be used to make appropriate decisions for geosteering the wellbore and LALA tool disposed therein during the drilling operation.'

Figure 5:
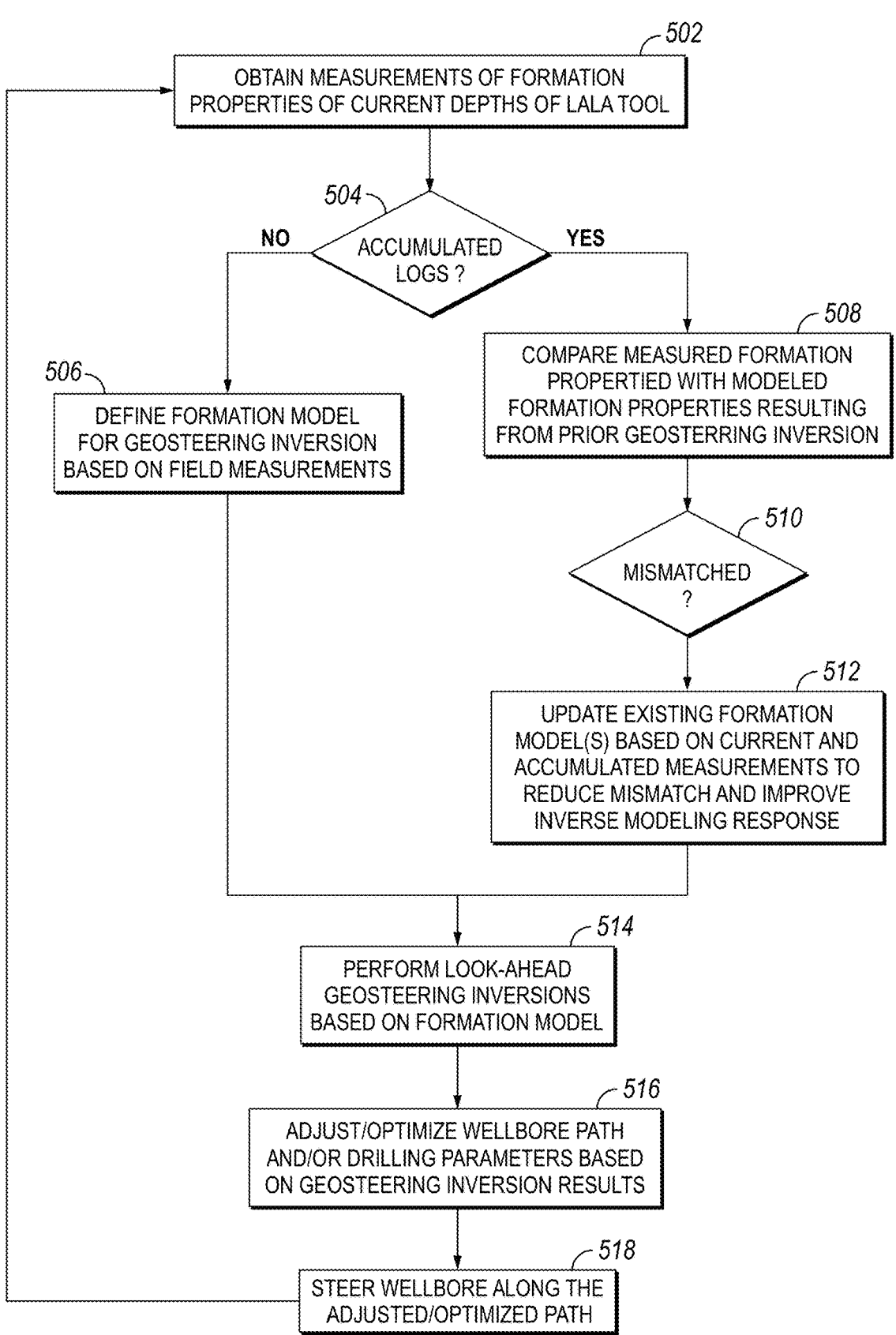
FIG. 5 is a flowchart of an exemplary method for performing knowledge-based LALA inversion based on measurements form a downhole LALA tool.

In the example shown in FIG. 5, method 500 begins in step 502, which includes obtaining measurements of formation properties for a current depth of the LALA tool within the formation. The current depth of the LALA tool may be based on a reference location designated for the tool. As described above, the reference location may correspond to, for example, a point along the LALA tool at or near the drill bit of the associated drilling assembly used to drill the wellbore. In one or more examples, the LALA tool may be configured to periodically log measurements of formation properties at various depths as the wellbore is drilled through different layers of the formation. Thus, the measurements obtained in step 502 may reflect the formation properties in a current layer of the formation measured by the LALA tool at any stage of the drilling process.

In one or more examples, the measurements logged at each stage of the drilling operation may be accumulated over the course of the drilling operation. The accumulated logs may be stored, for example, in a local memory or storage device coupled to the downhole LALA tool. Additionally, or alternatively, the logged measurements may be transferred via a wired connection or other communication pathway from the tool to a control unit located at the surface for processing and storage. In one or more examples, the steps of method 500 may be performed by a processing system of the control unit at the surface based on the measurements collected by the downhole LALA tool. Alternatively, the processing system and control unit may be implemented as a downhole component of the drilling assembly for automatically performing the LALA inversion techniques disclosed herein and geosteering the wellbore based on the measurements obtained in real-time from the LALA tool. In some implementations, some of the processing may be performed at the surface, e.g., by a surface control unit, and some may be performed downhole, e.g., by an automated downhole control unit of the drilling assembly. An example of such an automated downhole control unit will be described in further detail below with respect to FIG. 22.

As described above, the measurements collected by the LALA tool may include LALA or ultra-deep measurements of formation properties that are sensitive to look-ahead and look-around signals over a relatively wide detection range extending from the LALA tool as well as shallow measurements of formation properties that are sensitive to LALA signals only within a limited area surrounding the tool, owing to the relatively short detection range of the antennas that may be used to acquire such measurements.

Once the measurements are obtained for the current depth, method 500 may proceed to step 504, which includes determining whether or not any logged measurements of formation properties at prior depths have been accumulated. The number of logs that have been accumulated may provide an indication of when the measurements obtained in step 502 were collected by the LALA tool. For example, if it is determined in step 504 that no accumulated logs exist (e.g., no logs are stored in memory), it may be assumed that these measurements were collected by the LALA tool at the beginning of the drilling operation during an initial stage of drilling the wellbore. Method 500 in this case may then proceed to step 506, in which a formation model for geosteering inversion may be defined based on the measurements obtained in step 502.

In the steps following step 506, a geosteering inversion may be performed (step 514) with the formation model to estimate formation properties ahead of the tool's reference location (and drill bit) and make any adjustments to the planned wellbore path (step 516) as well as to the operating parameters of the drilling assembly for steering the wellbore (step 518) according to the adjusted path. As this may be an initial stage of the drilling operation, the measurements obtained in step 502 may be representative of formation properties at only one depth or within a limited depth range. Consequently, the formation model defined in step 506 may be a simplified two-layer LALA formation model. Also, the geosteering inversion in this example may be a point-to-point inversion performed with the simplified two-layer model to roughly approximate formation properties ahead of the tool's reference location. As will be described in further detail below, the simplified two-layer model may be updated or refined as measurements of formation properties at additional depths are accumulated during subsequent stages of the drilling operation. In this way, the formation model defined in step 506 may serve as an initial model and starting point for a more complex formation model and geosteering inversion scheme using the multi-depth measurements obtained during the drilling operation.

In a different example, it may be determined in step 504 that accumulated logs of formation property measurements at prior depths do exist. In this case, method 500 may proceed to step 508, in which the measured formation properties at the current depth are compared with the estimated or predicted formation properties resulting from a prior look-ahead inversion based on a current formation model (e.g., as defined previously in step 506). In step 510, it may be determined that there is a deviation or mismatch between the predicted formation properties and measured properties based on the comparison. In step 512, the current formation model may be updated or refined based on the measurements obtained in step 502 and from the accumulated logs. The formation model may be updated so as to reduce the mismatch and improve the forward modeling response when the look-ahead inversion (step 514) is performed again using the updated model.

In one or more examples, step 512 may include defining portions of the updated formation model representing the distribution of formation properties across layers of the formation behind and ahead of the current layer being measured. The measured formation properties may include, for example and without limitation, formation resistivity. The measurements obtained in step 502 from the LALA tool may be converted to formation resistivity values. It should be noted that the conversion might be performed using any of various processing schemes including, but not limited to, resistivity conversion charts, inversion, or other processing schemes.

In one or more examples, the shallow measurements from the accumulated logs may be used in step 512 to define a different portion of the formation model representing formation properties in layers behind the current layer and the tool's reference location. In one or more examples, step 512 may include performing a one-dimensional (ID) inversion of the current layer's formation resistivity based on the shallow measurements to determine a distribution of formation resistivity (or "resistivity profile") for different layers of the formation model at depths above or before the location of the tool reference within the current layer. Such a prior multi-layered formation model may be used in the look-ahead inversion to help reduce or eliminate shoulder-bed effects of nearby formation layers behind the tool's reference location.

Additionally, the LALA or ultra-deep measurements from the accumulated logs may be used in step 512 to define a portion of the formation model representing a distribution of formation properties (e.g., formation resistivity) across one or more layers ahead of the current layer and location of the tool's reference. Step 512 may include approximating a distribution of formation resistivity in one or more layers ahead of the tool reference location based on the ultra-deep measurements. In one or more examples, such a "look-ahead profile" of formation resistivity (and/or other formation properties) may be predefined for the formation model based on an analysis of the ultra-deep measurements. For example, the ultra-deep measurements from the accumulated logs may be analyzed on the basis of LALA signal derivatives, signal variances or other signal characteristics and then processed using any of various signal processing schemes using a linear scale and/or a logarithmic scale. In one or more examples, the processed LALA/ultra-deep measurements may be used during different stages of the drilling operation to estimate or predict relatively higher or lower resistivity values ahead of the tool's reference location. Accordingly, the predefined look-ahead profile of the formation model in this example may be used as a constraint or regulation in the geosteering inversion for estimating formation resistivity profiles ahead of the reference location.

As described above with respect to step 506, the steps following step 512 may include performing a geosteering inversion (step 514) based on the current (and now updated) formation model to estimate formation properties ahead of the tool's reference location (and drill bit). The results of the geosteering inversion may then be used to adjust or optimize the planned wellbore path (step 516) in addition to one or more operating parameters of the drilling assembly for steering the wellbore (step 518) according to the adjusted/optimized path. In contrast to the inversion and adjustment steps performed previously, the geosteering inversion performed following step 512 may be, for example, a knowledge-based geosteering inversion based on the updated formation model including the predefined profiles of formation properties distributed across different layers behind and ahead of the tool's reference location, as described above.

As described above with respect to steps 508, 510 and 512, the current look-ahead formation model may be further refined or updated during subsequent stages of the drilling operation to improve the match between the modeled formation properties resulting from the geosteering inversion and the measured formation properties for additional layers ahead of the tool's reference location. The results of the geosteering inversion based on the formation model may include, for example and without limitation, a current formation layer resistivity ("Rt") at the tool's reference location, a look-ahead resistivity ("Rs") of the formation layer ahead of the reference location, and a distance from the reference location to the next formation layer ahead (also referred to as the "distance to bed boundary" or "DTBB").

Additional features and characteristics of various formation models for performing geosteering inversion will be described in further detail below with respect to the examples provided in FIGS. 6-21. For purposes of discussion and explanation, the examples in FIGS. 6-21 will be described in the context of look-ahead and/or look-around inversion models based on measurements of formation resistivity obtained from a downhole LALA tool (e.g., an electromagnetic resistivity tool). However, examples of the present disclosure are not intended to be limited thereto.

Figure 6:
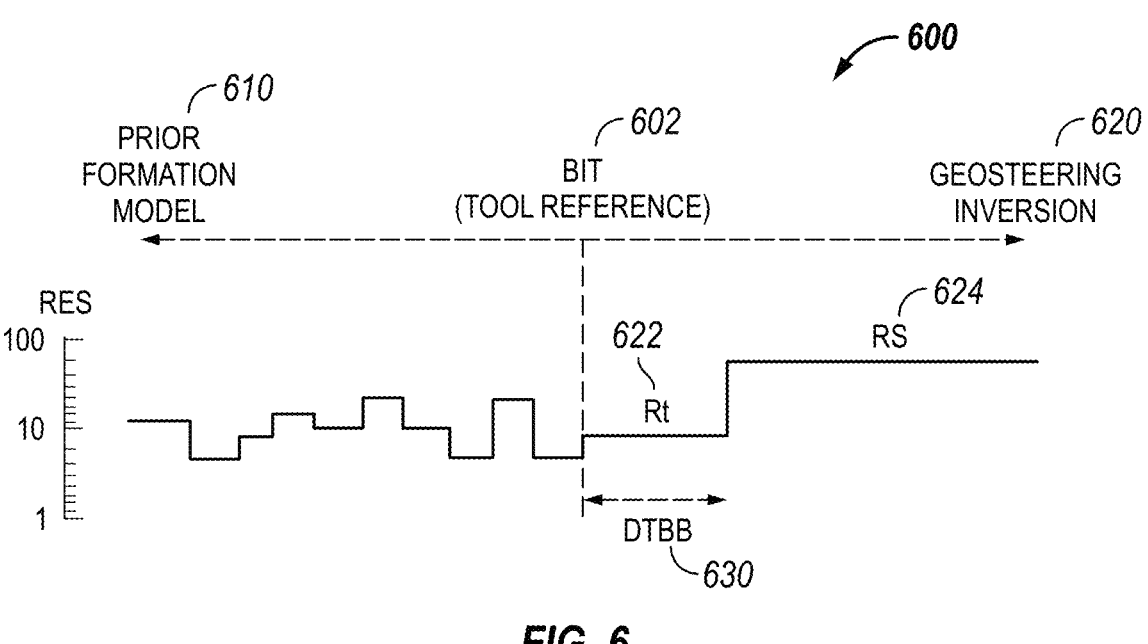
FIG. 6 illustrates an exemplary resistivity profile of a formation model for performing geosteering inversion with inverted prior multi-layers behind a LALA tool's reference location.

FIG. 6 illustrates an exemplary resistivity profile for different layers of a formation model 600 for performing geosteering inversion based on measurements from a downhole LALA tool (e.g., LALA tool 400 of FIG. 4, as described above). As shown in FIG. 6, model 600 may include a resistivity profile 610 representing a distribution of formation resistivity over multiple formation layers behind a current depth of the LALA tool corresponding to a tool reference location 602 within the formation. In one or more examples, resistivity profile 610 may be derived by performing a formation resistivity (Rt) ID inversion based on shallow measurements of formation properties collected by the LALA tool at various depths over the course of the drilling operation. Also, as shown in FIG. 6, model 600 may include a look-ahead profile 620 representing a distribution of formation resistivity between the current layer in which the LALA tool is located and one or more layers ahead of tool reference 602. Look-ahead profile 620 may include, for example, a resistivity (Rt) 622 of the current layer of the formation being measured and a resistivity (Rs) 624 of a shoulder-bed layer ahead of the current layer. In one or more examples, the results of the geosteering inversion performed using formation model 600 may include a distance to the shoulder bed boundary (DTBB) 630 determined based on resistivity (Rt) 622 of the current formation layer and resistivity (Rs) 624 of the formation layer ahead.

As described above, the look-ahead signal may be a smaller proportion of the total received signal relative to the look-around signal. To effectively separate the look-ahead signal from the look-around signal, a set of constraints or regulations may be needed in the geosteering inversion. In general, resistivity logs from an offset well can be utilized as 5 prior information in the geosteering inversion. Such prior information included in the inversion may enable good differentiation between look-ahead and look-around signals. However, this approach to signal differentiation may fail to produce good results if, for example, the offset well is far away from the drilling well in which the LALA tool is employed or the assumption of formation continuity between wells is false due to faults or complicated formation geology that have not been taken into account.

Furthermore, geosteering inversion results may be unstable due to a lack of information regarding the formation properties near and behind the location of the drill bit when, for example, the LALA tool is located in a thin-layered formation where resistivity contrasts between different formation layers may be difficult to distinguish. For example, resistivity contrasts between the layers of such a formation may be too insubstantial to detect. As a result, the tool's capability to explore desired formation layers ahead of the current layer with different (i.e., higher or lower) resistivity profiles than that of the current layer may be compromised by shoulder-bed effects of nearby formation layers around and/or behind the tool. For such thin-layered formations, geosteering inversion based on a two-layer look-ahead profile, such as profile 620 of formation model 600, may produce unreliable results for exploring desired formation layers ahead of the LALA tool. Formations with gradient resistivity profiles may also pose significant challenges for exploring targeted formation layers using LALA inversion based on such a two-layer look-ahead model. Thus, as will be described in further detail below with respect to FIGS. 5-21, formation models with gradient resistivity profiles may be used with the disclosed LALA inversion techniques to achieve improved look-ahead performance with respect to such complex formations.

Figure 7:
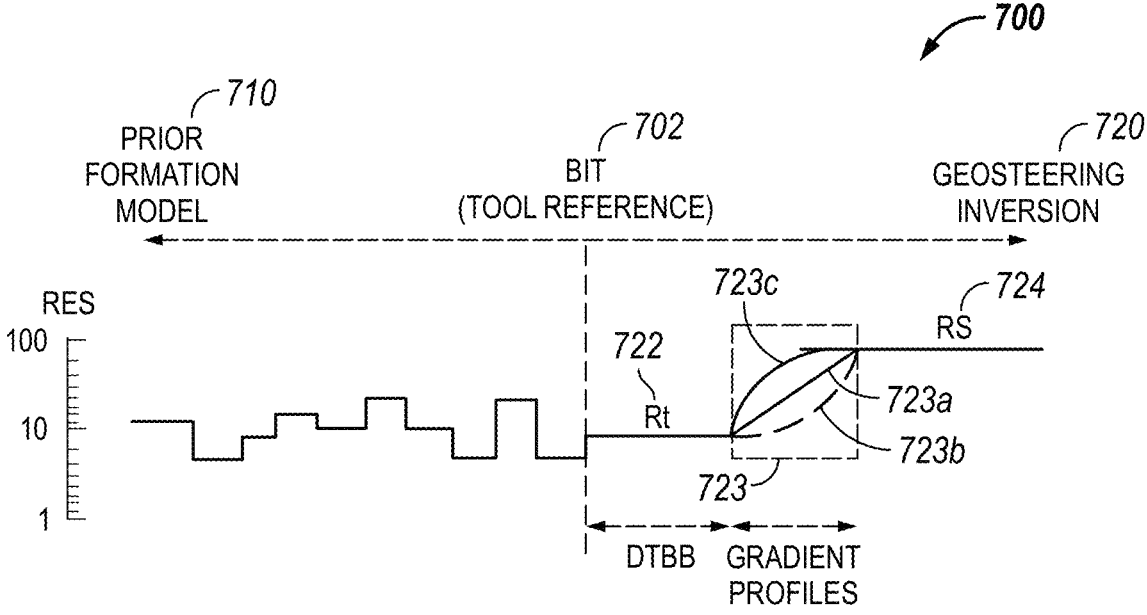
FIG. 7 illustrates an exemplary resistivity profile of a formation model for performing geosteering inversion with inverted prior multi-layers behind a LALA tool's reference location and a gradient resistivity transition for layers ahead.

FIG. 7 illustrates an exemplary resistivity profile of a formation model 700 for performing geosteering inversion with multiple formation layers behind a tool reference and a gradient resistivity transition between the current layer and layers ahead of the tool reference. As shown in FIG. 7, formation model 700 includes a resistivity profile 710 representing a distribution of formation resistivity over multiple formation layers before or behind a tool reference 702. Model 700 also includes a look-ahead profile 720 representing a distribution of formation resistivity between the current layer and the layers ahead of the current layer. In one or more examples, look-ahead profile 720 includes a profile window 723 for representing a gradient resistivity transition between a resistivity (Rt) 722 of a first formation layer (e.g., the current formation layer) and a resistivity (Rs) 724 of a second formation layer (e.g., the next formation layer ahead of the current layer). For example, any one of various gradient resistivity profiles may be used in profile window 723 to represent the formation resistivity within a transition area between the first and second formation layers. The gradient resistivity profile used in profile window 723 may be, for example, a linear or first-degree polynomial gradient resistivity profile 723a or either of second-degree polynomial gradient resistivity profiles 723b and 723c, as shown in FIG. 7. While only first and second degree polynomial gradient profiles are shown in FIG. 7, it should be noted that higher-degree polynomial gradient profiles may also be used, as desired for a particular implementation.

Figure 8:
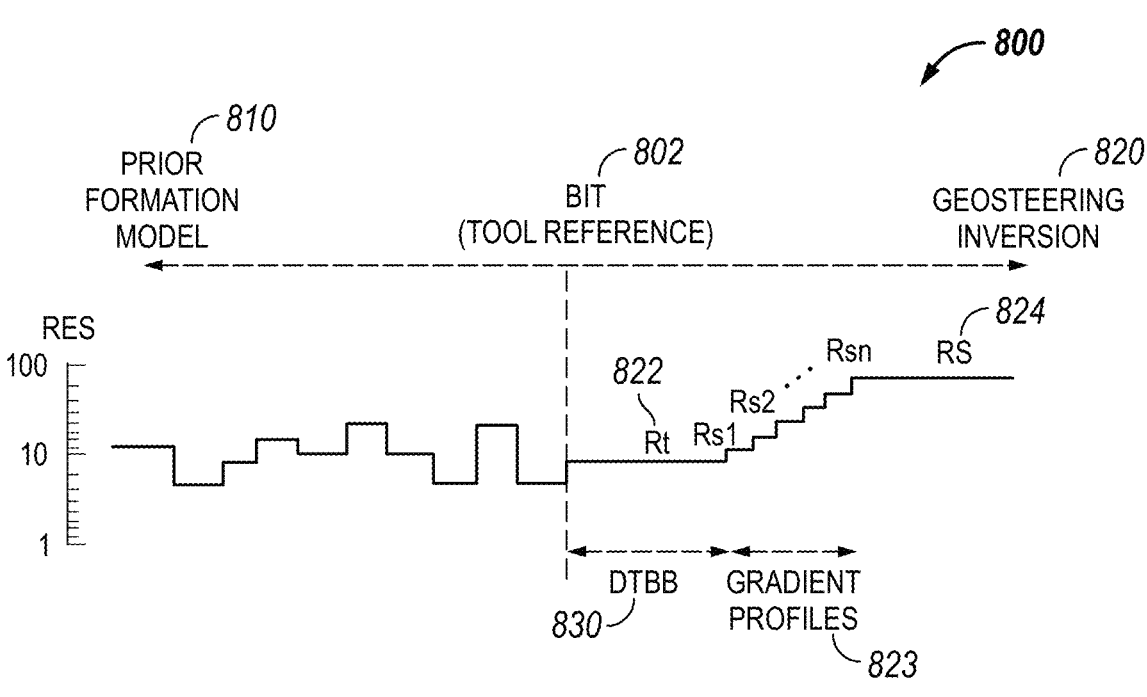
FIG. 8 illustrates an exemplary resistivity profile of a formation model for look-ahead inversion with inverted prior multi-layers behind a LALA tool's reference location and a gradient transition of resistivity values in an ascending order for layers ahead.

FIG. 8 illustrates an exemplary resistivity profile of a formation model 800 for performing geosteering inversion with a logarithmically linear gradient resistivity profile 820 representing a distribution of resistivity between the current layer and various layers ahead of a tool reference 802. As shown in FIG. 8, a gradient transition area 823 including a plurality of gradient resistivity values (Rs$_1$, Rs$_2$, . . . , Rsn) between a resistivity (Rt) 822 of a current formation layer and shoulder-bed layer resistivity (Rs) 824 of a shoulder-bed layer ahead of the current layer. In one or more examples, the gradient resistivity values may be used to implement a linear logarithmical interpolation between the current formation layer resistivity (Rt) 822 and shoulder-bed layer resistivity (Rs) 824. In this way, formation model 800 may be used to provide more accurate geosteering inversion results when dealing with complex formation profiles. Prior formation model 810 may also be illustrated.

In one or more examples, the results of the geosteering inversion performed using formation model 800 may include, for example, values of formation resistivity between the current layer formation resistivity 822 and shoulder-bed resistivity 824, a distance to shoulder-bed boundary (DTBB) 830, gradient resistivity values within the gradient transition area of the formation between the current and shoulder-bed layers, a thickness or width of gradient transition area 823, and a number of formation layers within gradient transition area 823. As shown in FIG. 8, the gradient resistivity values in the transition area represented by gradient resistivity profile 823 of formation model 800 may be in ascending order, descending order, or the same overall.

Figure 9:
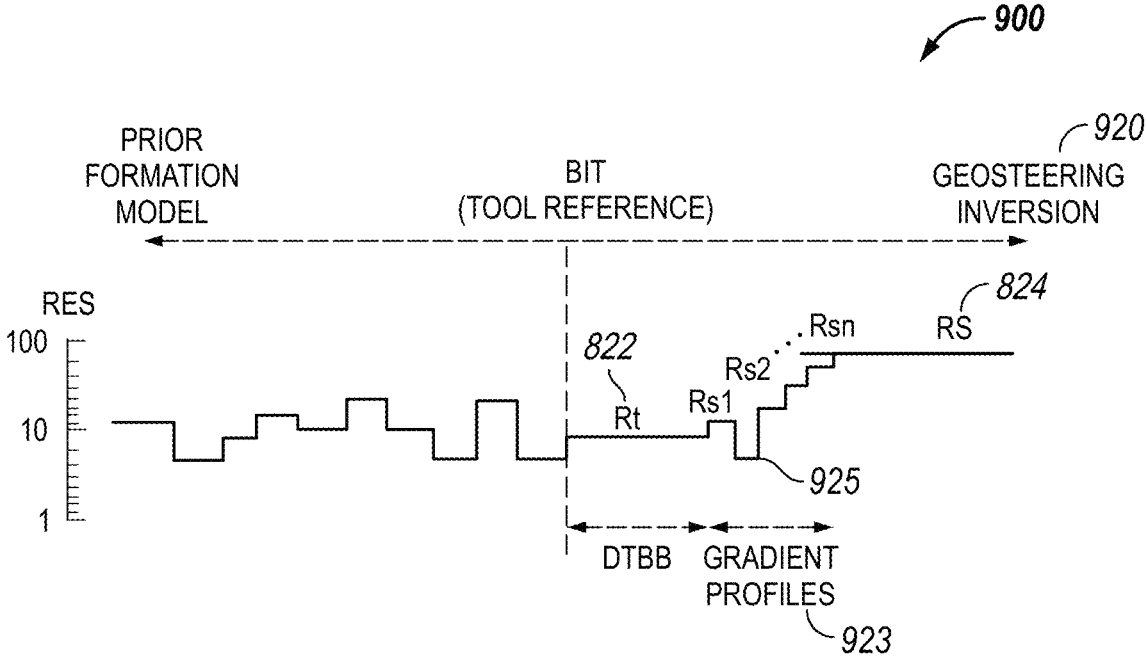
FIG. 9 illustrates an exemplary resistivity profile of a formation model for look-ahead inversion with inverted prior multi-layers behind a LALA tool's reference location and a gradient transition of resistivity values in a random order for layers ahead.

However, the gradient resistivity profiles of the actual formation may be in a random order, e.g., based on initial formation models derived from offset well data and/or look-ahead signals sufficiently sensitive to the transition area of the formation. Accordingly, the resistivity profile of the formation model may be modified to reflect this. For example, FIG. 9 illustrates a formation model 900 including a look-ahead profile 920 with a gradient transition area 923 in which the estimated value of formation resistivity (Rs2) for a particular formation layer 925 may have a lower resistivity than the two surrounding layers. Such a gradient resistivity profile may be used to achieve higher degree polynomial responses.

Figures 10, 11:
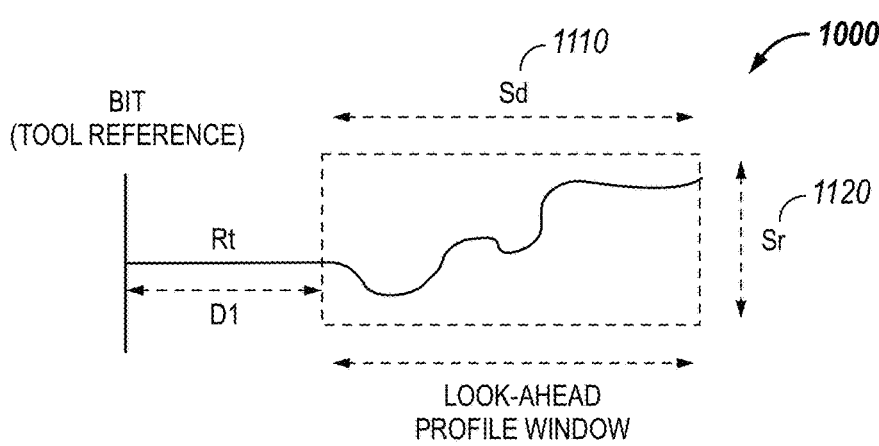
FIG. 10 shows a comparison between a log of formation resistivity measurements for different layers of a formation and a resistivity profile for a model of the formation for performing LALA inversion.
FIG. 11 illustrates an exemplary generalized look-ahead profile window for representing a logarithmically linear, polynomial, or other resistivity profiles in the look-ahead inversion.

The resistivity profiles of the above-described formation models of FIGS. 8 and 9 may be used to attain a better match between forward modeling responses and raw field measurements obtained from the LALA tool and/or LALA measurement scheme. FIG. 10 illustrates a comparison between a log of formation resistivity measurements for different layers of a formation and a resistivity profile for a model 1000 of the formation. As shown in FIG. 10, a look-ahead formation profile 1020 in the inversion may include a current formation resistivity Rt 1022, a resistivity Rs 1024 of a shoulder-bed ahead, a distance to the shoulder-bed boundary (DTBB or "D1"), and a look-ahead profile window 1023. Look-ahead profile window 1023 may represent a gradient transition area of a certain thickness or distance ("D2") between the current and shoulder-bed layer resistivities Rt 1022 and Rs 1024. The use of gradient resistivity profiles in the gradient transition area represented by profile window 1023 may enable the look-ahead inversion to obtain forward modeling responses that better match field measurements of complex formation properties.

In one or more examples, values for current formation resistivity (Rt) 1022, shoulder-bed resistivity (Rs) 1024, distance DI, and distance D2 of the gradient transition area within profile window 1023 may be estimated based on the geosteering inversion. Alternatively, one or more of these parameters may be determined based on measurements from offset wells or other data sources for the inversion. For example, the current formation resistivity (Rt) 1022 may be fixed or held constant at some predetermined value or may be regulated according to one or more conditions applied in the inversion based on shallow resistivity measurements collected at the tool reference location (e.g., at the drill bit). It also may be possible to apply regulations to constrain the values of D2 and/or shoulder-bed resistivity (Rs) 1024. Such regulations or constraints may be based on, for example, resistivity logs obtained from one or more offset wells. In one or more examples, the desired geosteering inversion parameter may be distance DI, indicating the actual distance from a current layer of the formation to a desired layer ahead.

Table 1 below presents the possible combinations of inverted parameters and outputs for the formation model and associated geosteering inversion scheme of FIG. 10:

| | Inversion Parameters | | | |
| --- | --- | --- | --- | --- |
| | Rt | Rs | D1 | D2 |
| Inverted Outputs | Unknown | Unknown | Unknown | Unknown |
| | Known or constrained | Unknown | Unknown | Unknown |
| | Known or constrained | Known or constrained | Unknown | Unknown |
| | Known or constrained | Unknown | Unknown | Known or constrained |
| | Known or constrained | Unknown | Unknown | Known or constrained |

FIG. 11 illustrates an example of a generalized profile window 1100 for representing a logarithmically linear, polynomial, or any other formation resistivity profile between the current layer and one or more layers ahead. In one or more examples, the resistivity profile in look-ahead profile window 1100 may be determined based on information obtained from one or more offset wells, deep and shallow measurements, or random selections. For example, a Monte Carlo processing technique or a stochastic simulation technique may be used to determine the resistivity profile based at least in part on random or pseudo-random variables. The corresponding inversion may optimize the profile according to any of various error minimization techniques including, but not limited to, minimum misfit, least-square error, or other data fitting techniques. However, due to the uncertainty of formation continuity between wells, a scaling factor 1110 for depth ("Sd") and a scaling factor 1120 for resistivity ("Sr") may be applied in the geosteering inversion so as to grow or shrink profile window 1100 and thereby, achieve a better match between forward modeling responses and raw measurements.

Table 2 below presents possible combinations of inverted parameters resulting from a geosteering inversion with a generalized profile window, such as profile window 1100 of FIG. 9:

18

| | Inversion Parameters | | | |
| --- | --- | --- | --- | --- |
| | Rt | Rs | D1 | D2 |
| Inverted Outputs | Unknown | Unknown | Unknown | Unknown |
| | Known or constrained | Unknown | Unknown | Unknown |
| | Known or constrained | Unknown | Known or constrained | Unknown |
| | Known or constrained | Unknown | Unknown | Known or constrained |
| | Known or constrained | Unknown | Known or constrained | Known or constrained |

Figure 12:
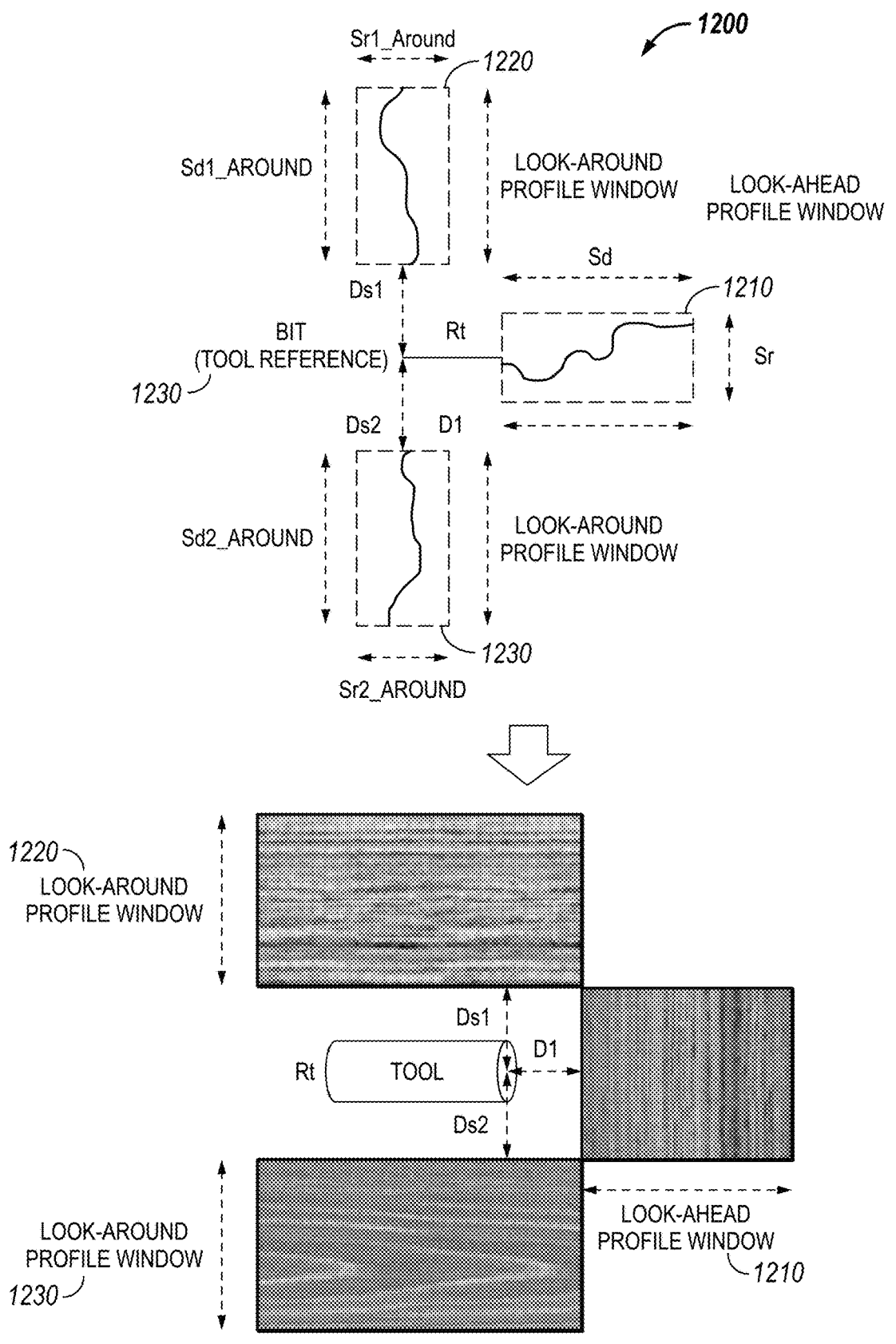
FIG. 12 illustrates exemplary generalized look-ahead and look-around profile windows for representing logarithmically linear, polynomial, or other resistivity profiles in the geosteering inversion.

In one or more examples, such a generalized profile window may be utilized for both look-ahead and look-around inversion, which may be particularly useful for horizontal drilling. As shown in the example of FIG. 12, in addition to a look-ahead profile window 1210, two look-around profile windows 1220 and 1230 may be used in the inversion. In FIG. 12, "Ds1" and "Ds2" represent distances from a tool reference location 1002 to look-around profile windows 1220 and 1230 above and below the tool reference 1202, respectively. "Sd1_Around" and "Sr1_Around" in this example represent scaling factors in depth and in resistivity, respectively, for look-around profile window 1220 above tool reference 1202. Similarly, "Sd2_Around" and "Sr2_Around" represent scaling factors in depth and in resistivity, respectively, for look-around profile window 1230 below the tool reference 1202. In areas of the formation where different profile windows may overlap, for example, at the corners between look-ahead profile window 1210 and look-around profile window 1220 or 1230, the inversion may be performed using either the look-ahead profile window or the appropriate look-around profile window. Alternatively, an average of the overlapping look-ahead and look-around profile windows may be used in the inversion for such formation areas.

Figure 13:
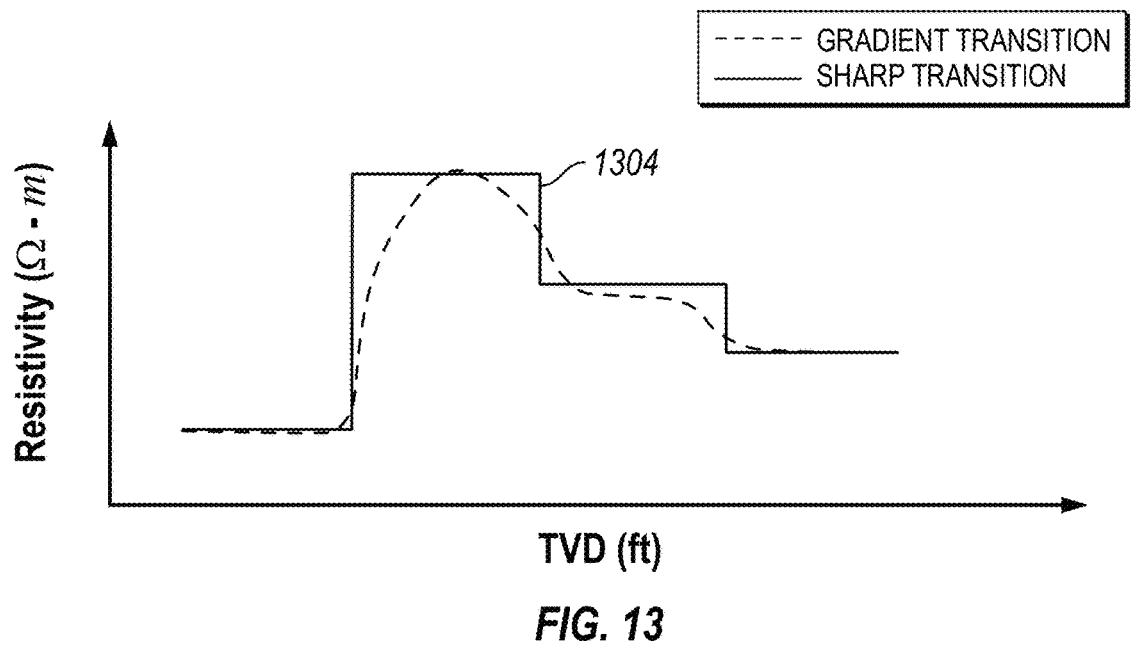
FIG. 13 is a graph that compares formations with gradient transition layers and formations with sharp layer boundaries.

Inversion models for 1D formations incorporate a gradient transition of horizontal and vertical resistivities between different formation layers. If the formation anisotropy is defined as a ratio between vertical and horizontal resistivity, then 1D formation models may be also represented as formation layers with progressively varying resistivities and anisotropy. FIG. 13 illustrates a comparison between formations with gradient transition layers 1302 and formations with sharp layer boundaries 1304. Since actual earth formations may be complicated, they may be more accurately represented by layers with gradual transitions than by layers with step boundaries. Using a piecewise-constant model with a staircase approximation, as discussed above may accurately estimate such gradually or slow changing formations in greater detail than conventional methods.

Figure 14:
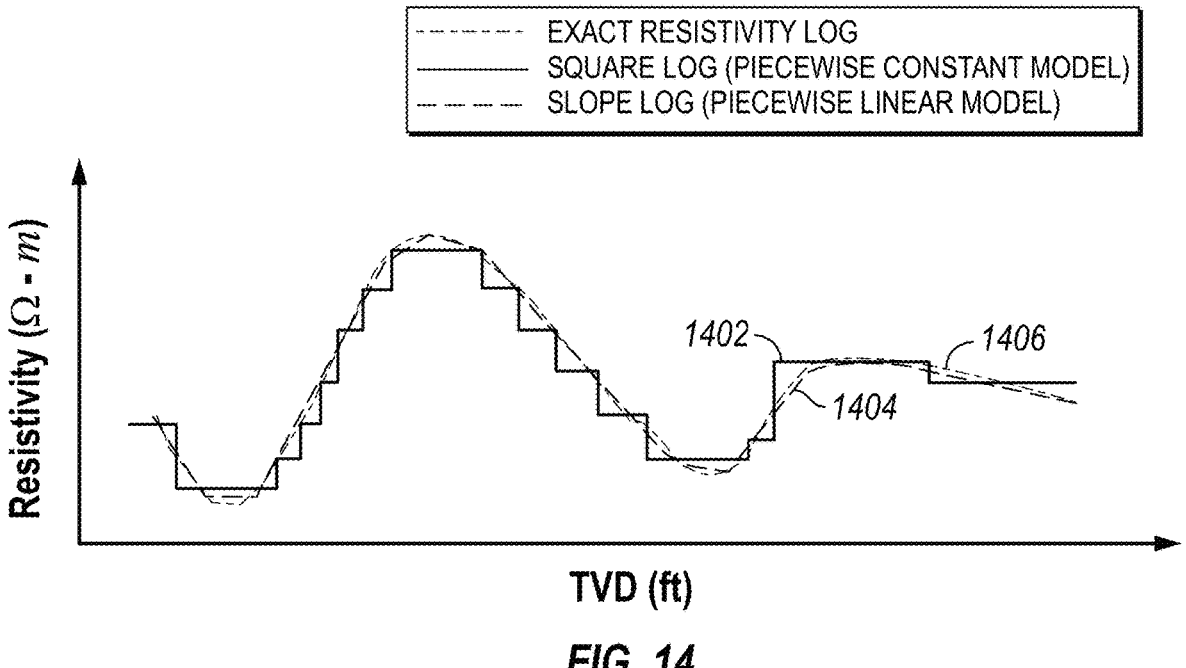
FIG. 14 is a graph that depicts an example earth formation model together with piecewise-constant and piecewise-linear models.

FIG. 14 illustrates a comparison between a square log (Piecewise constant model) 1402 and a slope log (Piecewise linear model) 1404 over the exact resistivity log 1406. Compared to square log (Piecewise constant model) 1402, slope log (Piecewise linear model) 1404 requires significantly fewer sublayers to characterize the true formation profile (i.e., exact resistivity log 1406). Therefore, the inversion based on slope log (Piecewise linear model) 1404 solves fewer unknown parameters, making the inversion significantly more computationally efficient and less ambiguous. In other words, an inversion using slope log (Piecewise linear model) 1404 is expected to yield a more accurate solution than an inversion using the piecewise-constant model when the number of inversion unknowns is the same.

Figure 15:
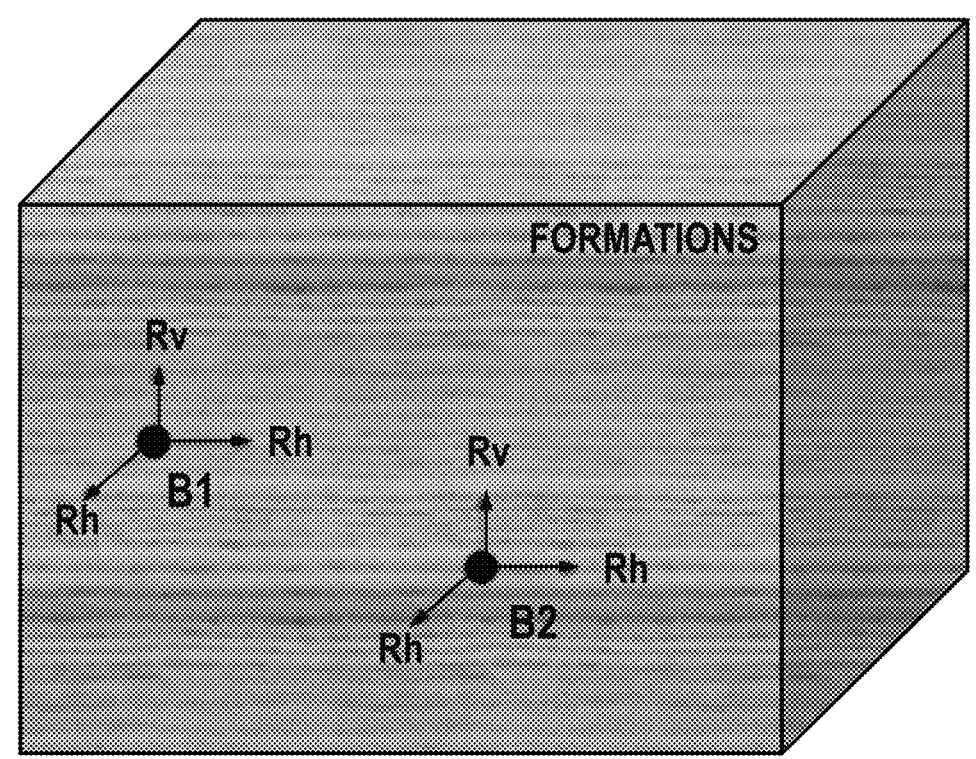
FIG. 15 illustrates a mathematical model illustrating horizontal/vertical resistivities and layer boundaries.
Figure 16:
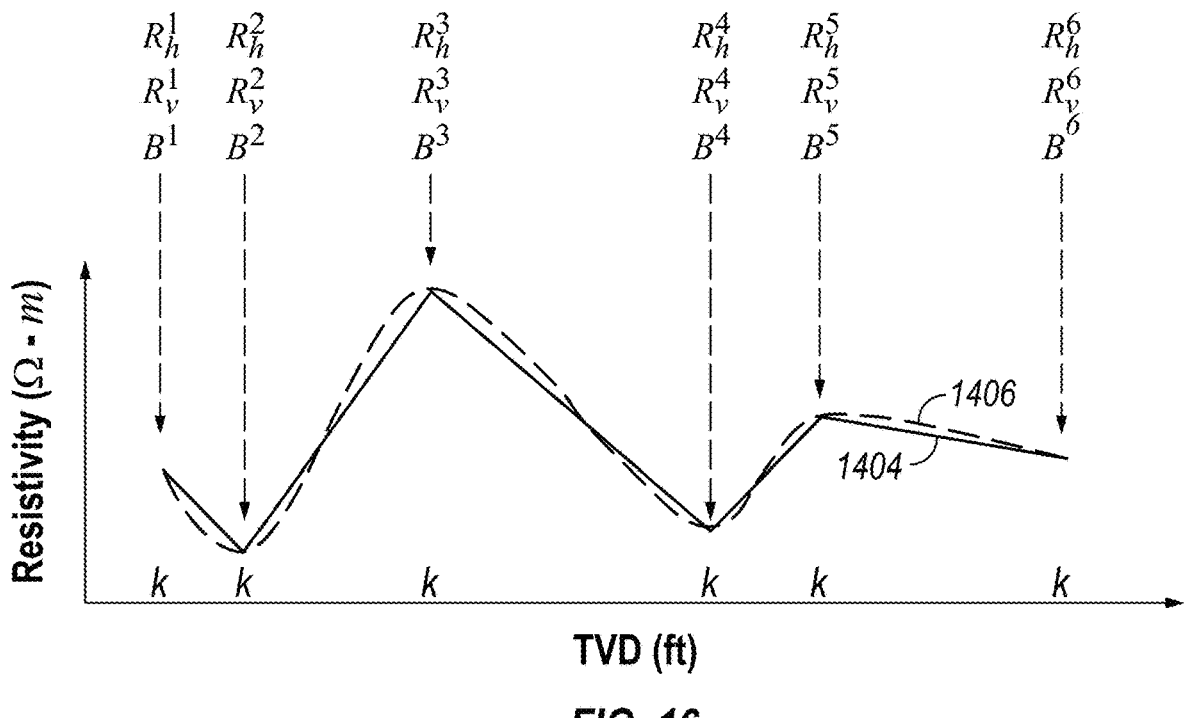
FIG. 16 is a graph illustrating a piecewise-linear inversion model.
Figure 17:
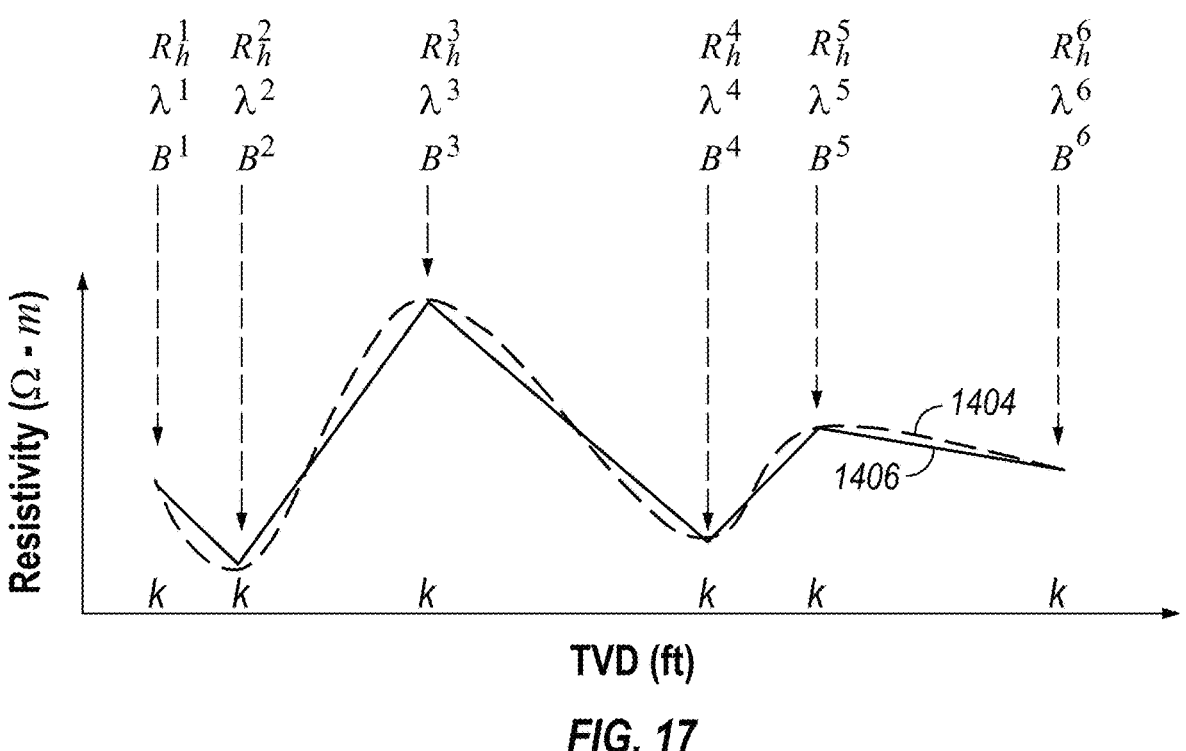
FIG. 17 is a graph illustrating formation resistivity anisotropy.

In order to integrate slope log (Piecewise linear model) 1404 as the underlying formation model for our 1D inversion, the horizontal/vertical resistivities, layer boundaries, and formation dipping angle (dip) must be estimated. FIG. 15 illustrates the horizontal/vertical resistivities, layer boundaries, and formation dipping angle (dip). FIG. 16 illustrates slope log (Piecewise linear model) 1404. At each transition k location, horizontal/vertical resistivities ($R_h^k$, $R_v^k$) and a layer boundary ($B^k$) may defined. FIG. 17 illustrates formation resistivity anisotropy $\lambda^k$ utilized at each transition location, if vertical resistivities are not available.

The input piecewise-linear formation model may be measured tool responses measured from first LALA sub assembly 102, second LALA sub assembly 104, third LALA sub assembly 106, and/or fourth LALA from sub assembly 108 with sub assembly 102 with an antenna structure including a tilted transmitter coil 302 and two tilted receiver coils 304 and 306. The input piecewise-linear formation model may then invert tool responses to yield anisotropy in each direction and layer boundary at each k location. Herein, resistivity anisotropy may be defined as a ratio between vertical and horizontal resistivity. After the piecewise-linear formation model is properly defined, the inversion discussed above may utilize various numerical schemes, comprising deterministic methods, Bayesian-based method, and machine-learning & deep-learning methods, can be used to solve for unknown formation parameters by matching predicted tool responses to measurement data. In examples, a single inversion procedure may be conducted to invert for unknown formation parameters comprising at least formation anisotropy in each direction and layer boundary all k locations simultaneously. In other examples, inverting every k location in real time using parallel computing. The k locations may or may not be evenly spaced. In addition, the formation anisotropy at each k location.

Figure 18:
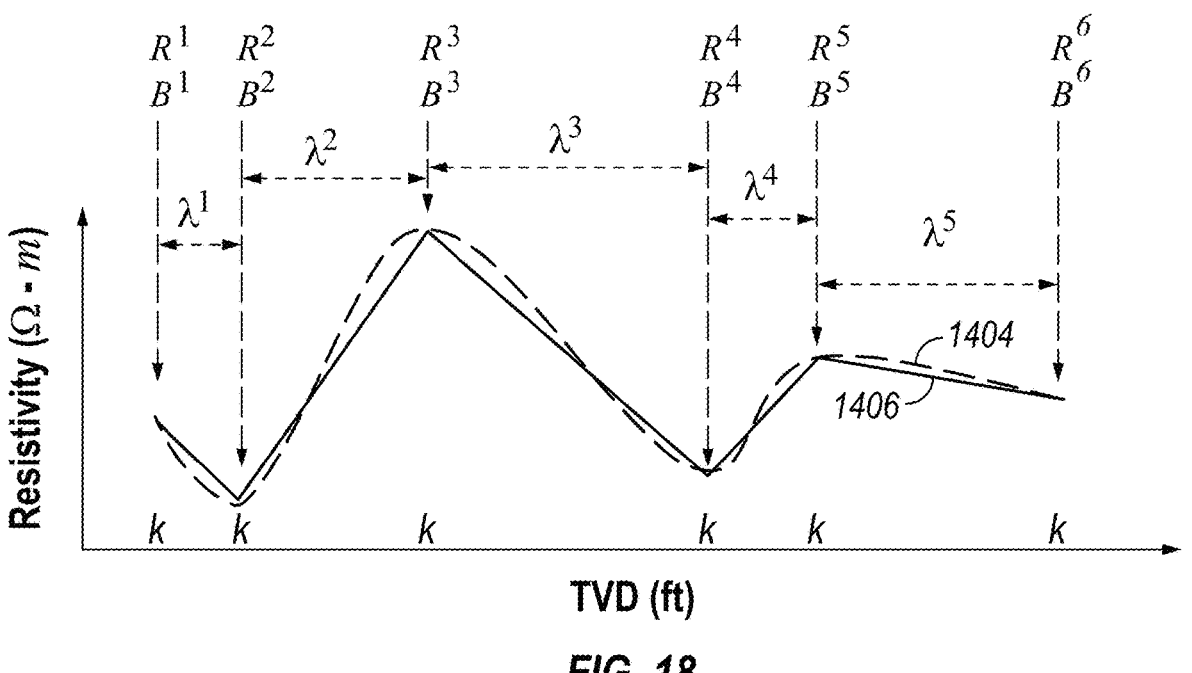
FIG. 18 is a graph of an another piecewise-linear model.

For an effective 1D inversion of formation with gradient transition boundaries, a slightly different piecewise-linear model may also be employed. FIG. 18 illustrates this alternate inversion model. At each transition location k, horizontal resistivities ($R_h^k$) and a layer boundary ($B^k$) are defined. However, the resistivity anisotropy $\lambda^k$ between two adjacent transition locations is assumed to be constant.

Figure 19:
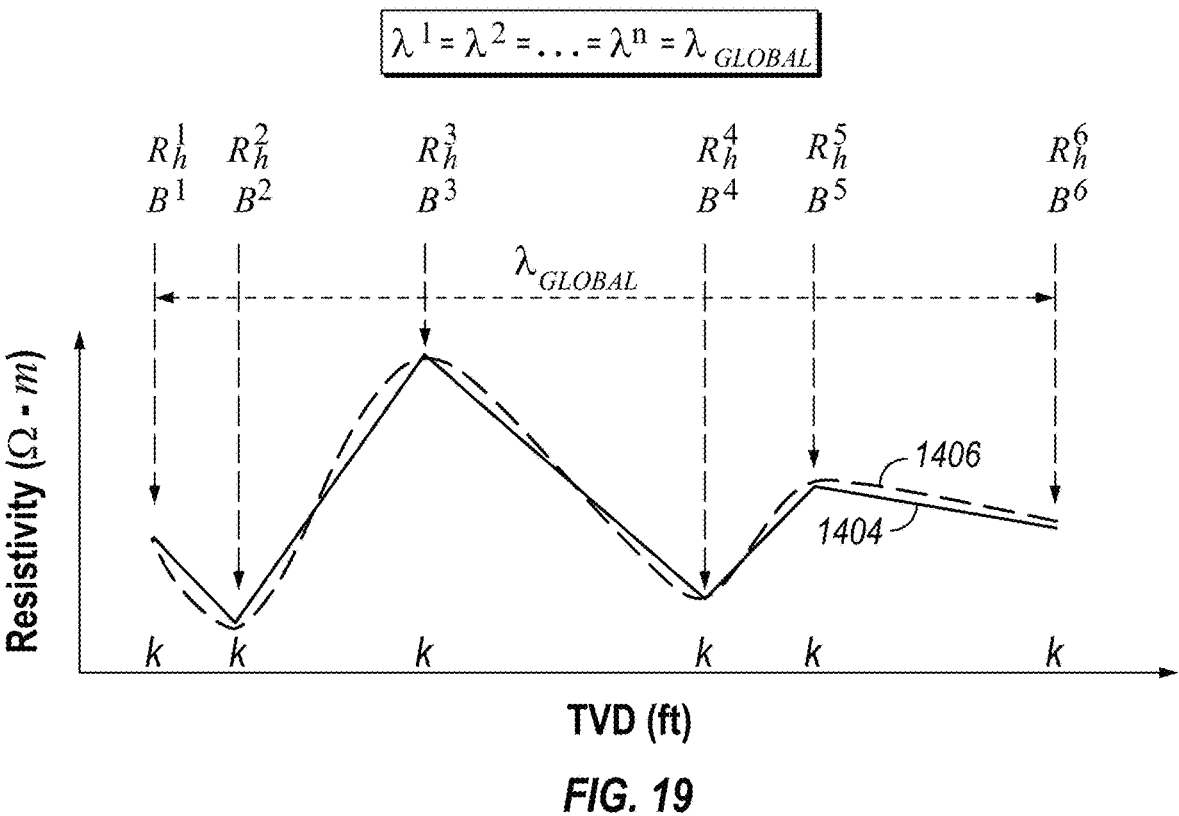
FIG. 19 is a graph illustrating the piecewise-linear model of FIG. 16 with the formation having the same resistivity anisotropy across all layers.

The piecewise-linear models discussed above assume distinct resistivity anisotropy for each layer, named local anisotropy. FIG. 19 illustrates if the entire formation is presumed to have the same resistivity anisotropy across all layers. In this case, a single resistivity anisotropy (global anisotropy) may be inverted instead by enforcing all resistivity anisotropy $\lambda^k$ equal across all layers.

Figure 20:
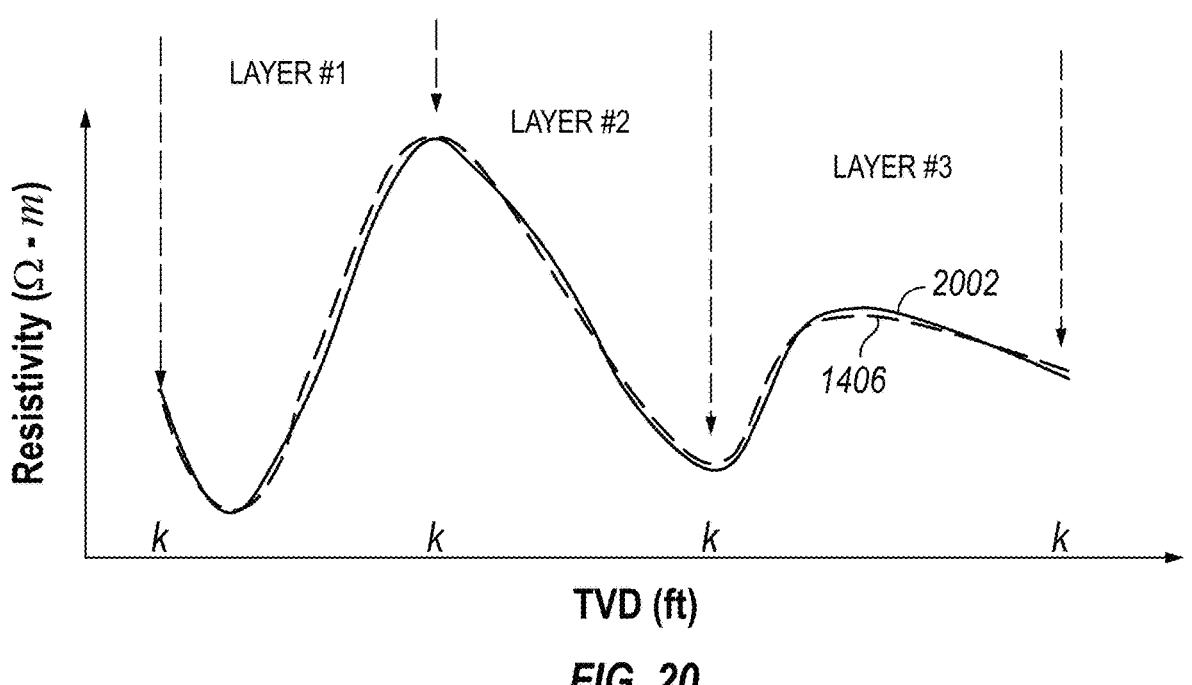
FIG. 20 is a graph of a piecewise-polynomial inversion model.

The above methodology may be extended to piecewise models with high-order or nonlinear functions. FIG. 20 illustrates piecewise-polynomial inversion model 2002, utilizing any higher order polynomial. Compared to the piecewise-linear models, more unknowns are required to solve for each layer in the piecewise high-order models because higher-order functions are applied to represent formation layers. On the other hand, the formation model can be equivalently characterized by fewer layers. Therefore, total number of inversion unknowns in the piecewise high-order models are still comparable to the piecewise-linear models. In the meantime, as expected, piecewise high-order models can result in more accurate estimations of complex formations when piecewise-linear models fail to capture variations of formation resistivity profile. Piecewise-polynomial inversion model 2002 uses the same tool measurement responses to estimate surrounding formation properties the same as the piecewise-linear inversion model. They also utilize the same numerical inversion schemes to invert for resistivity anisotropy in each direction and layer boundary all k locations simultaneously. In other examples, inverting every k location in real time using parallel computing. The k locations may or may not be evenly spaced. In addition, the resistivity anisotropy at each k location.

Figure 21:
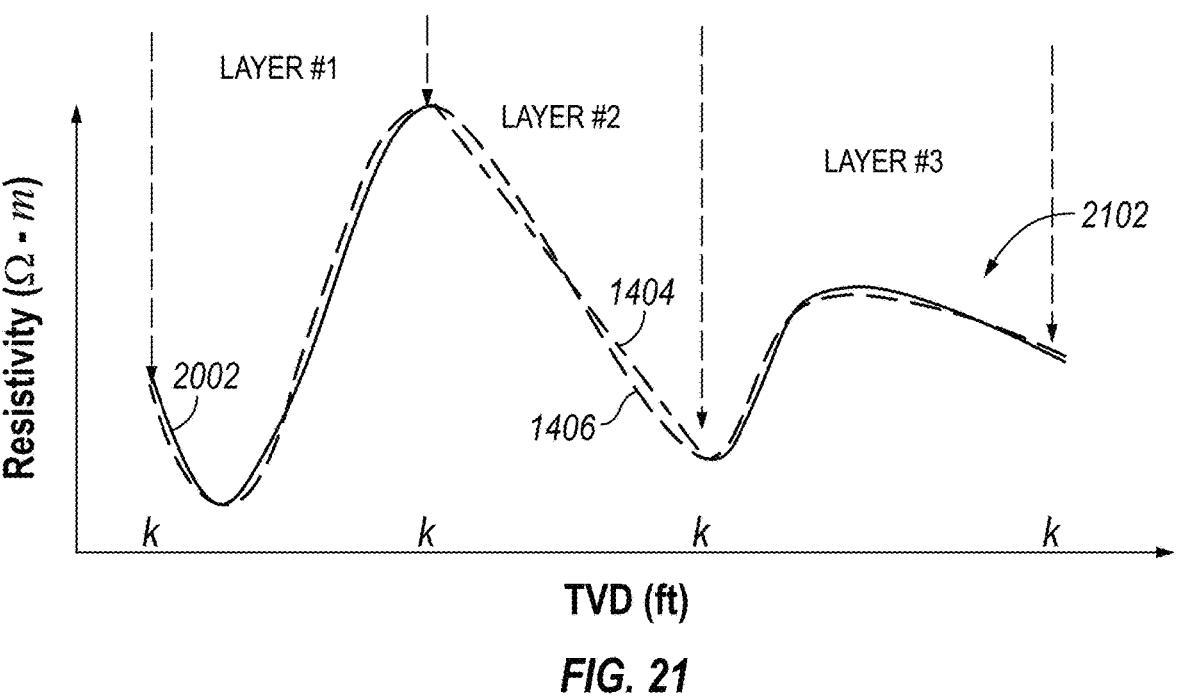
FIG. 21 is a graph of a hybrid piecewise-polynomial inversion model.

In addition, piecewise models with different orders may be employed in a hybrid manner. FIG. 21 illustrated hybrid piecewise model 2102. In examples, hybrid piecewise model 2102 may incorporate elements of piecewise-polynomial inversion model 2002 and/or slope log (Piecewise linear model) 1404. For instance, some prior knowledge may indicate that some layers have relatively simple resistivity variations, which can be by accurately modeled lower-order functions. The major advantage of this hybrid model is that it can reduce overall inversion model complexity and the total number of unknowns when piecewise lower-order models are sufficient to characterize formation resistivity profiles.

Figure 22:
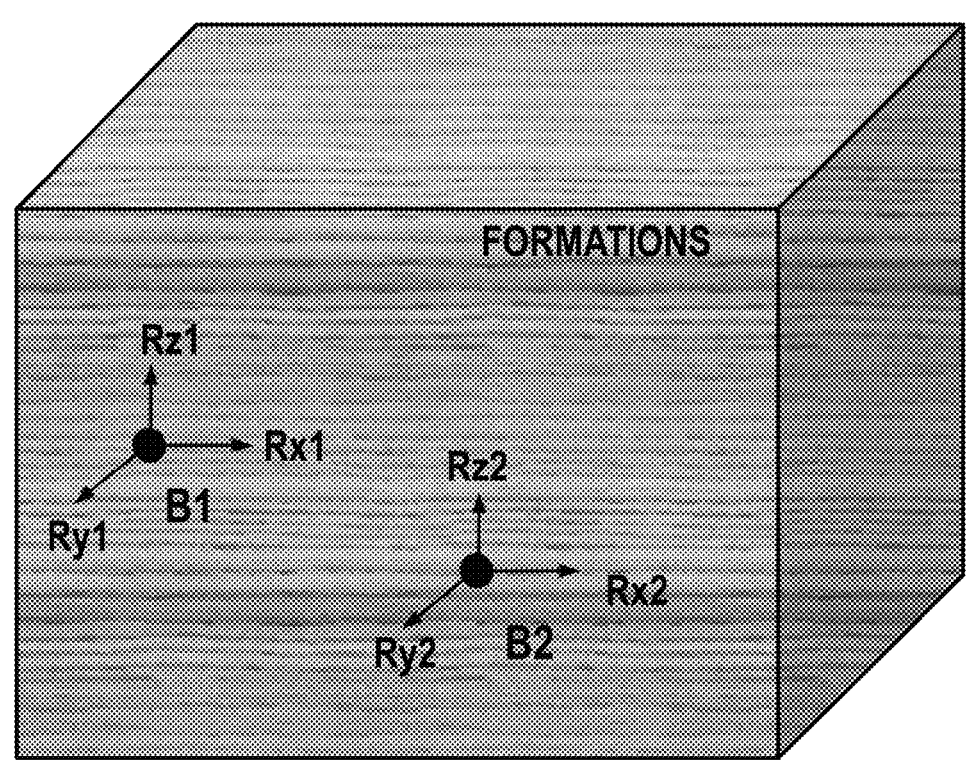
FIG. 22 illustrates a generic resistivity model for realistic formations.
Figures 23, 24:
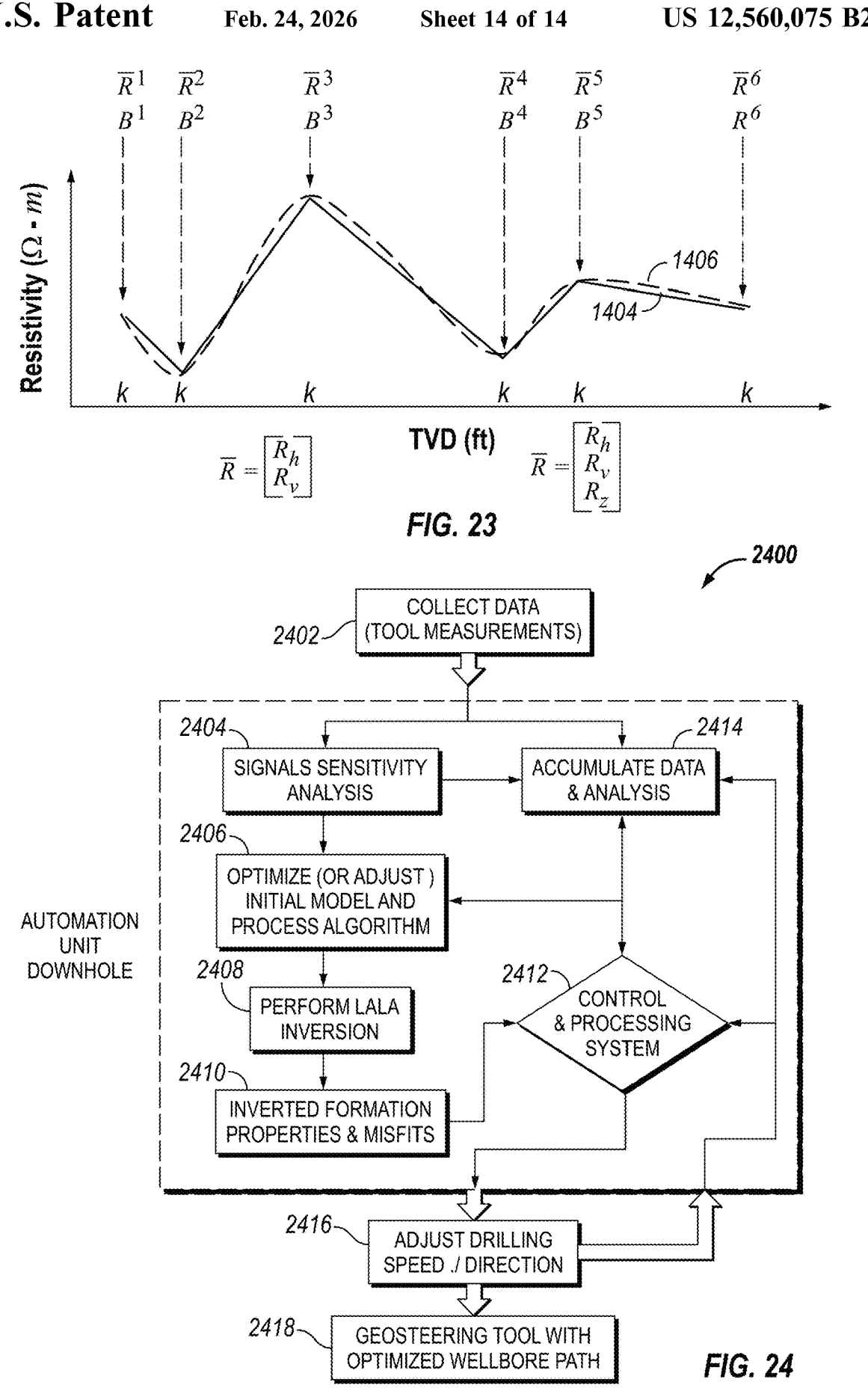
FIG. 23 is a graph of a detailed curve model to define the resistivity variations in x, y and z directions among different positions in the formations.
FIG. 24 is a flowchart of an exemplary processing scheme for automating knowledge-based geosteering inversion in a downhole closed-loop drilling application.

FIG. 22 illustrates a generic resistivity model for realistic formations. B1 and B2 are two positions in the formations having different resistivities along x, y and z directions. Between B1 and B2, utilizing different piecewise linear models to describe the resistivity change in x, y and z directions, respectively. FIG. 23 illustrates a slope log (Piecewise linear model) 1404 to define the resistivity variations in x, y and z directions among different positions in the formations.

Owing to very deep sensitivities, a LALA tool integrated within a drilling assembly may be capable of measuring formation properties in deeper formation zones ahead of the tool's current location and before they are penetrated by the drill bit. The results of the LALA inversion performed based on such measurements may be used to actively control the drilling assembly and steer the wellbore being drilled toward desired zones or to avoid potential hazards in advance. However, a large amount of data from the LALA tool may need to be processed in order for the LALA inversion to be performed during the drilling operation. As sending such data via telemetry or other communication pathway to a surface control unit for processing may cause significant delays, it may be desirable to process the data from the LALA tool in real-time and perform the LALA inversion downhole. As will be described in further detail below with respect to FIG. 24, a downhole automation unit may be used to implement such a real-time data processing and inversion scheme for automating the active geosteering process in a closed loop drilling application.

FIG. 24 is a flowchart of an exemplary processing scheme 2400 for automating LALA inversion and geosteering in a downhole closed-loop drilling application. The steps of processing scheme 2400 may be performed by, for example, a downhole automation unit integrated within a drilling assembly disposed within a wellbore being drilled. As will be described in further detail below, the automation unit may be configured to operate alongside a LALA tool (e.g., LALA tool 400 of FIG. 4, as described above) of the drilling assembly for processing data collected by the LALA tool and providing automated geosteering control during the drilling operation. Thus, as shown in FIG. 24, processing scheme 2400 may begin in step 2402, in which the automation unit obtains data from the LALA tool. As described above, such data may include measurements of formation properties at a current depth of the tool within the formation. Rather than sending the data up-hole to be processed by a control unit located at the surface, the data obtained in step 2402 may be provided as input to the downhole automation unit. It should be appreciated that such input data may be obtained directly from the LALA tool or from a local memory accessible to the automation unit and in which the data may be stored as it is collected by the LALA tool. Such a memory may be any type of electronic storage medium coupled to or integrated within the automation unit.

In step 2404, the automation unit may analyze the sensitivity of LALA signals included as part of the input data obtained from the LALA tool. In step 2406, an initial formation model for performing LALA inversion may be defined based on the obtained data and analysis thereof. In one or more examples, the initial formation model may be selected from a set of predefined models. Such predefined models may include, for example and without limitation, one or more of the above-described formation models of FIGS. 4-21 comprising a piecewise-linear formation model or a piecewise-polynomial inversion model 2002 (e.g., referring to FIG. 20). Once a suitable model has been defined or selected, an appropriate processing algorithm may also be selected. In one or more examples, such a processing algorithm may be related to the type of formation model that is defined or selected in step 2406. The predefined models and related processing algorithms may be stored, for example, in the above-described memory accessible to the automation unit.

Processing scheme 2400 may then proceed to step 2408, which includes performing LALA inversion based on the input data obtained in step 2402, the formation model as defined or selected in step 2406, and selected processing algorithm. In step 2408, a piecewise-linear formation model or a piecewise-polynomial inversion model 2002 (e.g., referring to FIG. 20) may be performed. The outputs or results of the inversion may include inverted formation properties including, resistivity anisotropy and bed boundaries at k locations, a current formation resistivity (Rt), a shoulder-bed formation resistivity (Rs), and a distance to the shoulder-bed boundary (DTBB), as described above. Step 2410 of processing scheme 2400 may include determining whether there is any deviation or mismatch between the inverted formation properties resulting from the inversion and the field data obtained in step 2402. Step 2410 may include, for example, determining whether a modeled resistivity profile based on the inverted modeling response fits with the measured resistivity log. In step 2412, any misfit between the inverted modeling responses and field data may be stored and processed, e.g., by a control and processing system of the automation unit.

In step 2414, the inversion results (e.g., inverted formation properties) and processed misfit data (e.g., inverted misfit of modeled properties at a certain depth) may be further analyzed in conjunction with data accumulated by the LALA tool during preceding stages of the drilling operation. Such data may include, for example, raw measurements and information relating to operating parameters, e.g., drilling direction and speed, of the drilling assembly. Such information may include, for example, a record of the drilling direction and speed set for drilling a path of the wellbore within a certain depth range. In one or more examples, the results of such analysis may be used to further optimize or refine the initial formation model that was previously defined/selected for the LALA inversion. For example, the initial formation model may be updated to minimize any deviation determined between formation properties estimated using the formation model and actual formation properties measured during the drilling operation.

The results of the analysis performed in step 2414 may also be used in step 2416 to make any appropriate adjust-ments to one or more of the operating parameters (e.g., drilling speed and/or direction) of the drilling assembly so as to adjust or optimize a planned wellbore path, e.g., toward a desired target formation zone or away from a predetermined hazard zone. In step 2418, the operating adjustments may be provided as input to a drill motor or controller thereof to steer the drilling assembly and wellbore along the adjusted/optimized path. In one or more examples, a data accumulation and analysis component (or "data accumulator and analyzer") of the downhole automation unit may be used to perform the analysis of step 2414 and communicate the results to the aforementioned control and processing system. The control and processing system in turn may communicate the appropriate operating parameter adjustments to the drill motor or controller for actively steering the drilling assembly along a desired wellbore path.

In an example, a target formation zone may be relatively far away from the current location of the drill bit and LALA tool within the wellbore being drilled. Consequently, raw measurements from the LALA tool may have very weak sensitivity with respect to formation properties in the target zone. As a result, the degree of uncertainty in the inversion (and/or inversion misfit) may be relatively high and inversion results may be unreliable. The downhole automation unit in this example may therefore select a simplified two-layer formation model as the initial model to be used for performing LALA inversion and adjusting one or more operating parameters (e.g., drilling speed and/or direction) based on the inversion results. As the LALA tool approaches the target zone over the course of the drilling operation, measurements having increasingly greater sensitivity to the formation properties in the target zone may be obtained.

In one or more examples, the above-described data accumulator and analyzer of the downhole automation unit may initiate a request to the control and processing system to reduce the current drilling speed such that more data can be collected within a smaller depth range. This may enable higher quality raw measurements to be obtained from the LALA tool and a more complex formation model to be used for representing formation properties in greater detail based on such measurements. In one or more examples, the complex formation model may be a version of the initial model that was previously defined or selected in step 2406 and that has been optimized or refined based on the additional measurements obtained from the LALA tool. Such an optimized formation model may then be used to control drilling direction and optimize well placement in real-time. It should be appreciated that such high-quality measurements may require more processing time and that the computation speed of the LALA inversion may be reduced as a result. Consequently, slower drilling speeds may be needed in order to have enough lead time for the measurements to be processed and LALA inversion results to be obtained.

In a further example, the above-described processing scheme 2400 may be applied in a similar manner to avoid a hazardous zone of the formation. An example of such a hazard zone may be a high pore pressure zone that may compromise wellbore stability. As there is generally a strong correlation between high pore pressure zones and formation resistivity, sudden changes in formation resistivity may provide an indication of abrupt changes in pore pressure. In one or more examples, the results of the inversion based on similar high-quality measurements obtained from the LALA tool, as described above, may be used to identify a hazard zone ahead of the current location of the drill bit (and the LALA tool's reference). Once the hazard zone in this example is identified, appropriate adjustments to the drilling direction and/or speed may be made to adjust the wellbore path and avoid drilling in the hazard zone. Such drilling adjustments may be made by, for example, the control and processing system of the downhole automation unit based on information provided by the data accumulator and analyzer, as described above.

In one or more examples, a hybrid parallel computation system may be utilized in the downhole automation unit to adjust or optimize the initial formation model and related process algorithm for LALA inversion. Further, multiple formation models may be defined or selected (step 2406) as suitable initial models for performing the LALA inversion (step 2408). The hybrid computation system may be used, for example, to optimize all or a subset of the most suitable initial models and related processing algorithms simultaneously. Such optimization may perform based at least in part on results of accumulated data analysis performed in the automation unit (step 2412), as described above. An output of the processing performed by the automation unit in this example may be an inverted formation model that provides the best match or least misfit between forward modeling responses and measured field data.

As described above, examples of the present disclosure are particularly useful for performing LALA inversion and geosteering. For example, the knowledge-based LALA inversion techniques disclosed herein allow formation models to be defined with various formation profile windows that can be adjusted or modified as desired for different geosteering applications and measurements of formation properties. Advantages of the present disclosure include, but are not limited to, enabling more accurate LALA inversion results to be obtained for making better geosteering decisions during a drilling operation.

In one example of the present disclosure, a computer-implemented method for performing geosteering inversion includes: obtaining measurements of formation properties accumulated by a downhole look-ahead look-around (LALA) tool during different stages of drilling a wellbore through a plurality of layers behind a current layer of an underground formation; determining a distribution of formation properties for the plurality of layers behind the current layer of the underground formation based on the measurements accumulated by the downhole LALA tool; defining a formation model for geosteering inversion based on the determined distribution of formation properties behind the current layer; obtaining measurements of the current layer's formation properties collected by the downhole LALA tool; and estimating a distribution of formation properties for one or more layers ahead of the current layer based on the formation model and the measurements of formation properties obtained for the current layer, the estimated distribution including a gradient transition of formation properties between the current layer and the one or more layers ahead of the current layer.

In a further example, the formation properties of the current layer are measured by the LALA tool relative to a tool reference representing a current depth of the LALA tool within the underground formation. In yet a further example, the LALA tool is integrated within a drilling assembly disposed within the wellbore being drilled and the tool reference corresponds to a location of a drill bit at a distal end of the drilling assembly. In yet a further example, the measurements include shallow measurements of formation properties within a limited detection range surrounding the LALA tool and ultra-deep measurements of formation properties within an extended detection range around and ahead of the tool reference. In yet a further example, the LALA tool is an electromagnetic resistivity tool and the measurements obtained from the LALA tool include values of formation resistivity. In yet a further example, the estimated formation properties include a resistivity of the current layer, a resistivity of each of the one or more layers ahead of the current layer, and a distance between the current layer and the one or more layers ahead of the current layer. The estimated distribution includes a gradient transition of formation resistivity between the current layer and the one or more layers ahead of the current layer. In yet a further example, the estimated distribution is based on a gradient profile of resistivity values transitioning between the current layer and the one or more layers ahead of the current layer in an ascending order, a descending order, or a random order. In yet a further example, the gradient profile is based on one or more profile windows representing the estimated distribution of formation properties ahead of and around the tool reference, and each of the one or more profile windows is adjustable based on one or more scaling factors associated with that profile window. In yet a further example, the formation model is defined by: comparing the measurements of the current layer's formation properties with a previously estimated distribution of formation properties based on an initial formation model defined in a preceding stage of drilling the wellbore; and defining the formation model by updating the initial formation model based on the comparison so as to minimize a deviation between the previously estimated distribution of formation properties and the measurements of the current layer's formation properties.

In yet a further example, the above-described method further includes: optimizing a path of the wellbore being drilled through the underground formation toward a target layer ahead of the current layer based on the estimated distribution of formation properties according to the updated formation model; and adjusting one or more operating parameters of the drilling assembly for steering the wellbore as it is drilled along the optimized path toward the target layer. In yet a further example, adjusting one or more operating parameters comprises adjusting at least one of a speed and a direction of the drilling assembly as the wellbore is drilled toward the target layer of the underground formation ahead of the current layer. In yet a further example, the geosteering inversion, including the comparing, updating, optimizing and adjusting, is performed in real-time by a downhole automation unit coupled to the LALA tool in response to measurements collected by the LALA tool during the different stages of drilling the wellbore.

In another example of the present disclosure, a computer-implemented method for performing geosteering inversion includes: obtaining measurements of formation properties accumulated by a downhole look-ahead look-around (LALA) tool during different stages of a drilling operation through a plurality of layers behind a current layer of an underground formation; determining an initial distribution profile of formation properties distributed across the plurality of layers behind the current layer of the underground formation based on the measurements accumulated by the downhole LALA tool; obtaining from the downhole LALA tool measurements of formation properties for the current layer of the underground formation; determining a look-ahead profile for estimating formation properties distributed between the current layer and one or more layers ahead of the current layer based on the initial distribution profile and the measurements obtained for the current layer, the look-ahead profile indicating a gradient transition of formation properties between the current layer and the one or more layers ahead; and defining a formation model for performing geosteering inversion according to the look-ahead profile.

In a further example of the present disclosure, a system for performing look-ahead inversion includes a drill string disposed within a wellbore being drilled through an underground formation, a LALA tool attached to the drill string for measuring formation properties during different stages of drilling the wellbore, at least one processor, and a memory coupled to the processor. The memory stores instructions, which when executed by the processor, cause the processor to perform functions, including functions to: obtain measurements of formation properties accumulated by a downhole look-ahead look-around (LALA) tool during different stages of drilling a wellbore through a plurality of layers behind a current layer of an underground formation, wherein the downhole LALA tool is integrated within a drilling assembly disposed within the wellbore being drilled; determine a distribution of formation properties for the plurality of layers behind the current layer of the underground formation based on the measurements accumulated by the downhole LALA tool; define a formation model for geosteering inversion based on the determined distribution of formation properties behind the current layer; obtain measurements of the current layer's formation properties collected by the downhole LALA tool; and estimate a distribution of formation properties for one or more layers ahead of the current layer based on the formation model and the measurements of formation properties obtained for the current layer, the estimated distribution including a gradient transition of formation properties between the current layer and the one or more layers ahead of the current layer. In one or more examples, the system also includes a drill controller attached to the drill string and coupled to the processor for steering the drill string along a path of the wellbore being drilled through the underground formation.

In yet a further example of the present disclosure, a computer-readable storage medium has instructions stored therein, which when executed by a computer cause the computer to perform a plurality of functions, including functions to: obtain measurements of formation properties accumulated by a downhole look-ahead look-around (LALA) tool during different stages of drilling a wellbore through a plurality of layers behind a current layer of an underground formation; determine a distribution of formation properties for the plurality of layers behind the current layer of the underground formation based on the measurements accumulated by the downhole LALA tool; define a formation model for geosteering inversion based on the determined distribution of formation properties behind the current layer; obtain measurements of the current layer's formation properties collected by the downhole LALA tool; and estimate a distribution of formation properties for one or more layers ahead of the current layer based on the formation model and the measurements of formation properties obtained for the current layer, the estimated distribution including a gradient transition of formation properties between the current layer and the one or more layers ahead of the current layer.

While specific details about the above examples have been described, the above hardware and software descriptions are intended merely as examples and are not intended to limit the structure or implementation of the disclosed examples. For instance, although many other internal components of the system 1200 are not shown, those of ordinary skill in the art will appreciate that such components and their interconnection are well known.

In addition, certain aspects of the disclosed examples, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the FIG.s illustrate the architecture, functionality, and operation of possible implementations of systems, methods and computer program products according to various examples of the present disclosure. It should also be noted that, in some alternative implementations, the functions noted in the block may occur out of the order noted in the FIG.s. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific examples are not intended to limit the scope of the claims. The examples may be modified by including, excluding, or combining one or more features or functions described in the disclosure. The systems and methods may comprise any of the various features disclosed herein, comprising one or more of the following statements.

Statement 1. A computer-implemented method for performing geosteering inversion, the method comprising: obtaining one or more measurements collected by a downhole tool at a wellbore depth; defining a piecewise-polynomial inversion model describing one or more formation parameters; performing an inversion on the piecewise-polynomial inversion model to determine one or more formation parameters of the inversion model; and adjusting a path of the downhole tool based at least in part on the or more formation parameters of the piecewise-polynomial inversion model.

Statement 2. The computer-implemented method for performing geosteering inversion of statement 1, wherein the one or more formation parameters are formation horizontal resistivity, formation anisotropy, or bed boundaries.

Statement 3. The computer-implemented method for performing geosteering inversion of statement 1, wherein the one or more measurements are raw field measurements from a look-ahead look-around electromagnetic downhole tool.

Statement 4. The computer-implemented method for performing geosteering inversion of statement 1, wherein the piecewise-polynomial inversion model is a piecewise-linear or piecewise-constant inversion model with different order of polynomial parameters.

Statement 5. The computer-implemented method for performing geosteering inversion of statement 4, wherein boundaries defining the piecewise-polynomial inversion model are a plurality of k locations.

Statement 6. The computer-implemented method for performing geosteering inversion of statement 5, wherein the piecewise-polynomial inversion model utilizes any order polynomial at every k location.

Statement 7. The computer-implemented method for performing geosteering inversion of statement 6, wherein formation horizontal resistivity, formation anisotropy and layer boundary are defined for every k location in the piecewise-polynomial inversion model.

Statement 8. The computer-implemented method for performing geosteering inversion of statement 6, wherein horizontal resistivity and layer boundary are defined for every k location but anisotropy is constant between any two k locations.

Statement 9. The computer-implemented method for performing geosteering inversion of statement 6, wherein the piecewise-polynomial inversion model comprises deterministic methods, Bayesian-based method, and machine-learning and deep-learning methods.

Statement 10. The computer-implemented method for performing geosteering inversion of statement 9, further comprising determining a misfit between one or more unknown wellbore parameters and the one or more measurements.

Statement 11. A system comprising: a downhole tool configured to obtain one or more measurements at a wellbore depth; and an information handling system configured to: define a piecewise-polynomial inversion model with the one or more measurements; and perform an inversion on the piecewise-polynomial inversion model to determine one or more formation parameters.

Statement 12. The system of statement 11, wherein the downhole tool is configured in a look-ahead look-around tool electromagnetic tool.

Statement 13. The system of statement 12, wherein the one or more formation parameters are formation horizontal resistivity, formation anisotropy or bed boundaries.

Statement 14. The system of statement 11, wherein boundaries defining the piecewise-polynomial inversion model are a plurality of k locations.

Statement 15. The system of statement 14, wherein the piecewise-polynomial inversion model utilizes any order polynomial at every k location from the plurality of k locations.

Statement 16. The system of statement 15, wherein formation horizontal resistivity, formation anisotropy and layer boundary are defined for every k location from the plurality of k locations.

Statement 17. The system of statement 16, wherein formation horizontal resistivity and layer boundary are defined for every k location, but formation anisotropy is constant between any two k locations from the plurality of k locations.

Statement 18. The system of statement 11, wherein the piecewise-polynomial inversion model comprises deterministic methods, Bayesian-based method, and machine-learning and deep-learning methods.

Statement 19. The system of statement 11, further comprising a control and processing system of the information handling system.

Statement 20. The system of statement 19, wherein the control and processing system is configured to adjust a path of the downhole tool based at least in part on the one or more of the one or more formation parameters.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the examples in the form disclosed. Many modifications and variations will be apparent to those of ordinary skill in the art without departing from the scope and spirit of the disclosure. The illustrative examples described herein are provided to explain the principles of the disclosure and the practical application thereof, and to enable others of ordinary skill in the art to understand that the disclosed examples may be modified as desired for a particular implementation or use. The scope of the claims is intended to broadly cover the disclosed examples and any such modification.

What is claimed is:

1. A computer-implemented method for performing geosteering inversion, the method comprising:

obtaining one or more measurements related to a geological formation, wherein the one or more measurements are collected by a downhole tool at a wellbore depth within the geological formation;

based on the one or more measurements at the wellbore depth, defining a formation model representative of one or more formation parameters across one or more layers of the geological formation, wherein the formation model defines the one or more formation parameters at each layer of the one or more layers via a piecewise-polynomial inversion model comprising a plurality of polynomial functions, wherein each polynomial function of the plurality of polynomial functions corresponds to a layer of the one or more layers;

performing an inversion on the piecewise-polynomial inversion model to determine one or more values of the one or more formation parameters; and adjusting a path of the downhole tool based at least in part on the one or more values of the one or more formation parameters.

2. The computer-implemented method for performing geosteering inversion of claim 1, wherein the one or more formation parameters are formation horizontal resistivity, formation anisotropy, or bed boundaries.

3. The computer-implemented method for performing geosteering inversion of claim 1, wherein the one or more measurements are real-time field measurements from a look-ahead look-around electromagnetic downhole tool.

4. The computer-implemented method for performing geosteering inversion of claim 1, wherein the piecewise-polynomial inversion model is a piecewise-linear or piecewise-constant inversion model with different order of polynomial parameters.

5. The computer-implemented method for performing geosteering inversion of claim 1, wherein a plurality of k locations on the piecewise-polynomial inversion model represent the boundaries between each layer of the one or more layer.

6. The computer-implemented method for performing geosteering inversion of claim 5, wherein the piecewise-polynomial inversion model utilizes any order polynomial at every k location.

7. The computer-implemented method for performing geosteering inversion of claim 6, wherein formation horizontal resistivity, formation anisotropy and layer boundary are defined for every k location in the piecewise-polynomial inversion model.

8. The computer-implemented method for performing geosteering inversion of claim 6, wherein horizontal resistivity and layer boundary are defined for every k location but anisotropy is constant between any two k locations.

9. The computer-implemented method for performing geosteering inversion of claim 6, wherein the piecewise-polynomial inversion model comprises deterministic methods, Bayesian-based method, and machine-learning and deep-learning methods.

10. The computer-implemented method for performing geosteering inversion of claim 9, further comprising determining a misfit between one or more unknown wellbore parameters and the one or more measurements.

11. A computer-implemented system for performing geosteering inversion, the system comprising:
  a downhole tool configured to receive an input to adjust the path of the downhole tool and obtain one or more measurements related to a geological formation, wherein the one or more measurements are collected at a wellbore depth within the geological formation; and
  an information handling system configured to:
    define, based on the one or more measurements a formation model representative of one or more formation parameters across one or more layers of the geological formation, wherein the formation model defines the one or more formation parameters at each layer via a piecewise-polynomial inversion model comprising a plurality of polynomial functions, wherein each polynomial function of the plurality of polynomial functions corresponds to a layer of the one or more layers;

perform an inversion on the piecewise-polynomial inversion model to determine one or more values of the one or more formation parameter; and
    produce the input to adjust the path of the downhole tool based at least in part on the one or more values of the one or more formation parameters.

12. The system of claim 11, wherein the downhole tool is configured in a look-ahead look-around tool electromagnetic tool.

13. The system of claim 12, wherein the one or more formation parameters are formation horizontal resistivity, formation anisotropy or bed boundaries.

14. The system of claim 11, wherein a plurality of k locations on the piecewise-polynomial inversion model represent the boundaries between each layer of the one or more layers.

15. The system of claim 14, wherein the piecewise-polynomial inversion model utilizes any order polynomial at every k location from the plurality of k locations.

16. The system of claim 15, wherein formation horizontal resistivity, formation anisotropy and layer boundary are defined for every k location from the plurality of k locations.

17. The system of claim 16, wherein formation horizontal resistivity and layer boundary are defined for every k location, but formation anisotropy is constant between any two k locations from the plurality of k locations.

18. The system of claim 11, wherein the piecewise-polynomial inversion model comprises deterministic methods, Bayesian-based method, and machine-learning and deep-learning methods.

19. The system of claim 11, further comprising a control and processing system of the information handling system.

20. The system of claim 19, wherein the control and processing system is configured to adjust a path of the downhole tool based at least in part on the one or more values of the one or more formation parameters.

* * * * *